United States Patent
Faccin

(10) Patent No.: US 8,295,830 B1
(45) Date of Patent: Oct. 23, 2012

(54) SYSTEM AND METHOD FOR ENABLING AUTHORIZATION OF LOCAL BREAKOUT FOR INTERNET PROTOCOL MULTIMEDIA SERVICES

(75) Inventor: Stefano Faccin, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1122 days.

(21) Appl. No.: 12/116,658

(22) Filed: May 7, 2008

Related U.S. Application Data

(60) Provisional application No. 60/916,968, filed on May 9, 2007.

(51) Int. Cl.
*H04W 4/00* (2009.01)
(52) U.S. Cl. .............. 455/432.1; 370/331; 455/433; 455/435.1
(58) Field of Classification Search ............ 370/331; 455/414.1, 414.2, 414.3, 432.1, 433, 435.1, 455/435.2
See application file for complete search history.

(56) References Cited

U.S. PATENT DOCUMENTS

| | | | | |
|---|---|---|---|---|
| 7,031,706 | B2 * | 4/2006 | Tuohimetsa et al. | 455/432.3 |
| 7,349,402 | B2 * | 3/2008 | Isomaki et al. | 370/395.2 |
| 7,469,145 | B2 * | 12/2008 | Li | 455/450 |
| 7,817,618 | B2 * | 10/2010 | Hurtta | 370/351 |
| 2010/0054222 | A1 * | 3/2010 | Rune | 370/338 |

OTHER PUBLICATIONS

Faccin et al., "IP Multimedia Services: Analysis of Mobile IP and SIP Interactions in 3G Networks", IEEE Communications Magazine, Jan. 2004 (pp. 113-120).*

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

(Continued)

*Primary Examiner* — Jean Gelin
*Assistant Examiner* — Michael S Bush

(57) ABSTRACT

A mobile communication terminal includes a registration module that initiates a registration of the mobile communication terminal with Internet protocol (IP) multimedia subsystems (IMS) within a home network. The registration module initiates registration when the mobile communication terminal is roaming in a visited network. The mobile communication terminal also includes a session module that initiates a session set-up with the IMS to enable use of IMS resources. At least one of the registration module and the session module provide a first IP address to the IMS during at least one of the registration and the session set-up. The mobile communication terminal communicates with a first packet data network (PDN) that is local to the visited network using the first IP address in order to use at least one of the IMS resources.

8 Claims, 13 Drawing Sheets

OTHER PUBLICATIONS

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2001™ IEEE Standard for Local and metropolitan area networks; Part 16: Air Interface for Fixed Broadband Wireless Access Systems; IEEE Computer Society and the IEEE Microwave Theory and Techniques Society; Apr. 8, 2002; 348 pages.

IEEE Std 802.16/2004 (Revision of IEEE Std 802.16/2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

3GPP TS 23.228 V8.4.0 (Mar. 2008); $3^{rd}$ Generation Partnership Project; Technical Specification Group Services and System Aspects; IP Multimedia Subsystem (IMS); Stage 2 (Release 8); 234 pages.

3GPP TS 23.401 V8.1.0 (Mar. 2008); $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8); 171 pages.

3GPP TS 23.402 V8.1.1 (Mar. 2008); $3^{rd}$ Generation Partnership Project; Technical Specification Group Services and System Aspects; Architecture enhancements for non-3GPP accesses (Release 8); 163 pages.

* cited by examiner

SYSTEM AND METHOD FOR ENABLING AUTHORIZATION OF LOCAL BREAKOUT FOR INTERNET PROTOCOL MULTIMEDIA SERVICES

CROSS-REFERENCE TO RELATED APPLICATIONS

This application claims the benefit of U.S. Provisional Application No. 60/916,968, filed on May 9, 2007. The disclosure of the above application is incorporated herein by reference in its entirety.

FIELD

The present disclosure relates to communication systems, and more particularly to protocols for managing connectivity and mobility of network devices relative to remote networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, an exemplary network system 10 includes a plurality of user equipment terminals (UE) 12-1, 12-2, . . . , and 12-N (collectively referred to as UE 12) that may include wireless terminals. Examples of wireless terminals include mobile phones, personal digital assistants (PDAs) and computers. The UE 12 may communicate with a home network 13 via a visited network 14. The home and visited networks 13, 14 may each include networks of service providers that may be in different countries, respectively. The home and visited networks 13, 14 may also each communicate with one or more packet data networks (PDNs) 15-1, 15-2. The PDNs 15-1, 15-2 communicate data as packets via Internet protocol (IP) addresses. An exemplary PDN is the Internet.

The home network 13 may include a home public land mobile network (HPLMN), and the visited network 14 may include a visited public land mobile network (VPLMN) of a $3^{rd}$ Generation Partnership Project (3GPP™) network system. An exemplary home network 13 communicates with one or more visited networks.

Referring now to FIG. 2, the network system 10 is illustrated in more detail. The home network 13 includes a home PDN gateway 16 and an authentication/authorization/accounting (AAA) server 18. The PDN gateway 16 may communicate with a first PDN 15-1, such as the Internet. An exemplary UE 12 connects to the home network 13 via the visited network 14 through an attachment point. Once attachment to the home and visited networks 13, 14 is successful, the UE 12 may then connect to the first PDN 15-1. For example, the UE 12 may be a cellular phone. When the cellular phone roams into the visited network 14, either the visited network 14 or the cellular phone initiates attachment. If the attachment is successful, then, when the cellular phone requires use of network resources, such as access to another cellular phone in the first PDN 15-1, the cellular phone connects to the first PDN 15-1.

The visited network 14 includes one or more attachment points (collectively referred to as attachment points 20). For example, five attachment points 20-1, 20-2, 20-3, 20-4, and 20-5 are shown. The attachment points 20 may include any suitable wireless or wired interface. For example, the attachment point 20-1 may include a 3GPP interface. The attachment point 20-1 may use the Universal Mobile Telecommunications System (UMTS), a Long Term Evolution (LTE) Radio Access Network (RAN) and/or an Evolved Universal Terrestrial Radio Access Network (EUTRAN).

For example, the attachment point 20-2 may include a Worldwide interoperability for Microwave Access (WiMAX) interface. The attachment point 20-3 may include a wired interface, such as a cable modem or a Digital Subscriber Line (DSL). The attachment point 20-4 may include a 3GPP-2 interface, which may use Code Division Multiple Access 2000 (CDMA2000). The attachment point 20-5 may include a Wireless Local Area Network (WLAN) interface.

The attachment points 20 may communicate with other networks, such as the home network 13, via a serving gateway 22, which therefore acts as an anchoring point. The serving gateway 22 may also include switching and routing functionality to allow the attachment points 20 to communicate between each other. The visited network 14 may include an AAA proxy server 24, which communicates with the AAA server 18 of the home network 13.

The serving gateway 22 may communicate with a second PDN gateway 26 of the visited network 14. The second PDN gateway 26 may communicate with a second PDN 15-2. The serving gateway 22 may provide a different IP address for each PDN 15-1, 15-2 from the respective gateways 16, 26. The UE 12 may not be aware of the multiple IP addresses and may always initiate network communications with and connect to the first PDN 15-1 of the home network 13 via the visited network 14. The home network 13 may then allow "local breakout" to occur. Local breakout involves the UE 12 communicating with a device in the second PDN 15-2, which may be local to the visited network 14. Prior to local breakout, the UE 12 and the first PDN 15-1 sever connectivity.

For example, the UE 12 is shown attached to the attachment point 20-1. When the UE 12 initiates the attachment to the attachment point 20-1, the attachment point 20-1 determines whether the UE 12 is authorized by querying the AAA proxy server 24. The AAA proxy server 24 may identify the AAA server 18 based on identification information from the UE 12 and may also request authorization information from the AAA server 18.

The AAA proxy server 24 may cache data from the UE 12 for a specified period of time or for as long as the UE 12 is attached to one of the attachment points 20 of the visited network 14. In addition, the AAA server 18 may provide an expiration time for this authorization information. The authorization information may include whether the UE 12 is authorized to connect to the visited network 14, what resources the UE 12 should be offered, and what quality of service the UE 12 should be guaranteed.

In various implementations, the AAA proxy server 24 may provide the address of the AAA server 18 to the attachment point 20-1, which then queries the AAA server 18 directly. Access and authorization may be provided by any suitable method, including a home subscriber server (HSS).

Connections between the UE 12 and gateways 16, 22, 26 may be referred to as tunnels. The UE 12 may exchange information and access resources through the tunnels. When tunnels are set-up between the PDN gateways 16, 26 and the UE 12, the UE is considered connected to the respective PDNs 15-1, 15-2. Assuming that the UE 12 is authorized to attach, a first tunnel is created between the attachment point 20-1 and the serving gateway 22. A second tunnel is created between the serving gateway 22 and the first PDN gateway 16. If the UE 12 requests communication with a device in the second PDN 15-2, and the home network 13 grants the request, the second tunnel is closed. A third tunnel is then created between the serving gateway 22 and the second PDN gateway 26. However, if the UE 12 switches from the attachment point 20-1 to another of the attachment points 20, or to another 3GPP attachment point (not shown), only the first tunnel may be modified.

Referring now to FIG. 3, an example of a timeline of steps performed when the UE 12 connects to the home network 13 via the visited network 14 is presented. The UE 12 may be a first cell phone that connects with the first PDN 15-1, which may be the Internet. The UE 12 performs access and authentication with the attachment point, such as the attachment point 20-1. This may include communicating with the AAA server 18. Upon authentication, the UE 12 attempts to attach to the attachment point 20-1. The AAA server may use an identifier of the UE 12, such as a network address identifier, that uniquely identifies the UE 12.

The UE 12 may request an IP address from the attachment point 20-1. The attachment point 20-1 may determine that there is a home network 13 and may request the serving gateway 22 to enable communications with the home network 13. The attachment point 20-1 may also provide an indication that the attachment point 20-1 is bound to the UE 12. The serving gateway 22 in turn communicates with the home network 13 and requests an IP address, $IP_1$, from the PDN gateway 16.

The serving gateway 22 sends binding acknowledgement messages to the attachment point 20-1 from the PDN gateway 16. The binding acknowledgement messages include $IP_1$. A tunnel is then set up between the serving gateway 22 and the PDN gateway 16 for transmission of packets to and from the UE 12. The attachment point 20-1 then assigns $IP_1$ to UE 12. The UE 12 may not be aware that it is connected to the visited network 14.

If the home network 13 is aware that the second PDN 15-2 includes a device that the UE 12 is attempting to communicate with, the home network 13 may allow local breakout to the second PDN 15-2. However, this allowance is after connection to the home network 13 and first PDN 15-1 has been established, as previously discussed regarding the timeline of FIG. 3. Communications with and connection to the first PDN 15-1 are then halted, and the serving gateway 22 requests an IP address, $IP_2$, from the second PDN gateway 26. The serving gateway 22 sends binding acknowledgement messages to the attachment point 20-1 from the second PDN gateway 26. The binding acknowledgement messages include $IP_2$. A tunnel is then set up between the serving gateway 22 and the second PDN gateway 26 for transmission of packets to and from the UE 12.

SUMMARY

A mobile communication terminal includes a registration module that initiates a registration of the mobile communication terminal with Internet protocol (IP) multimedia subsystems (IMS) within a home network. The registration module initiates registration when the mobile communication terminal is roaming in a visited network. The mobile communication terminal also includes a session module that initiates a session set-up with the IMS to enable use of IMS resources. At least one of the registration module and the session module provide a first IP address to the IMS during at least one of the registration and the session set-up. The mobile communication terminal communicates with a first packet data network (PDN) that is local to the visited network using the first IP address in order to use at least one of the IMS resources.

In other features, the mobile communication terminal also includes a connection module that initiates connectivity with the home and visited networks prior to the registration. The mobile communication terminal also includes a reception module that receives the first IP address based on the connectivity with the visited network. The reception module receives a second IP address that differs from the first IP address based on the connectivity with the home network. The reception module receives a second IP address from the IMS that differs from the first IP address. The reception module receives the second IP address during at least one of the registration and the session set-up.

In other features, the mobile communication terminal includes an analysis module that selects the first IP address. The reception module receives the second IP address prior to receiving the first IP address. The analysis module determines that the first PDN is permitted to use the at least one of the IMS resources based on IMS signals. The mobile communication terminal also includes a request module that requests use of the at least one of the IMS resources during at least one of the registration and the session set-up. The mobile communication terminal also includes an attachment module that initiates attachment to the home network through the visited network when the mobile communication terminal is roaming.

In other features, the mobile communication terminal includes a response module that receives a response from the home network during the attachment to the home network that indicates that the mobile communication terminal is permitted to selectively connect remotely to the first PDN through the visited network. The mobile communication terminal remotely connects to the first PDN through the visited network following the attachment to the home network. The response indicates that the mobile communication terminal has permission to selectively connect remotely to a second PDN through the home network.

In other features, the mobile communication terminal includes memory that stores a profile of the mobile communication terminal. The profile includes at least one of a type of the mobile communication terminal and a capability of the mobile communication terminal. The capability includes a restriction that limits use of the first PDN. The mobile communication terminal also includes a cellular network interface and a network interface. The mobile communication terminal communicates with the visited network via at least one of the cellular network interface and the network interface. The registration includes exchanges between the mobile communication terminal and the IMS using Session Initiation Protocol (SIP) messages.

In other features, a network system includes the mobile communication terminal, the home network that includes the IMS and the visited network. The visited network includes a first PDN gateway that communicates with the first PDN. The home network includes a second PDN gateway that communicates with a second PDN. The first PDN gateway provides the first IP address for communications between the mobile communication terminal and the first PDN. The second PDN gateway provides a second IP address for communications between the mobile communication terminal and the second PDN. The visited network includes at least one attachment point.

In other features, the mobile communication terminal communicates with the visited network through the attachment point. The attachment point includes at least one of a Universal Mobile Telecommunications System (UMTS), a Long Term Evolution (LTE) Radio Access Network (RAN) and an Evolved Universal Terrestrial Radio Access Network (EU-TRAN). The IMS includes a control module that selects a first one of a plurality of PDNs. The plurality of PDNs includes the first PDN and the at least one of the IMS resources. The IMS provides the mobile communication terminal with the selection. The mobile communication terminal rejects the selection and provides an alternative selection to the IMS that includes a second one of the plurality of PDNs.

In other features, an Internet protocol (IP) multimedia subsystem (IMS) of a home network system includes a registration module that controls a registration of a mobile communication terminal with the IMS when the mobile communication terminal is roaming in a visited network. The IMS also includes a session module that controls a set-up of a session with the mobile communication terminal to enable use of IMS resources. The IMS also includes a selection module that receives a request from the mobile communication terminal to use at least one IMS resource via a first IP address.

In other features, the selection module receives the request during at least one of the registration and the set-up of the session. The selection module rejects the first IP address for use of the at least one IMS resource. The IMS also includes a transmission module that transmits a second IP address to the mobile communication terminal during at least one of the registration and the set-up of the session. The second IP address differs from the first IP address. The registration includes exchanges between the mobile communication terminal and the IMS using Session Initiation Protocol (SIP) message. The selection module selects a first one of a plurality of PDNs that includes the at least one of the IMS resources.

In other features, the plurality of PDNs includes the first PDN. The selection module provides the mobile communication terminal with the selection. The selection module receives a rejection from the mobile communication terminal of the selection and further receives an alternative selection from the mobile communication terminal that includes a second IP address for a second one of the plurality of PDNs.

In other features, a network system includes the IMS, the mobile communication terminal and the visited network. The visited network includes a first packet data network (PDN) gateway that provides the first IP address to the mobile communication terminal. The mobile communication terminal also includes a registration module that initiates the registration of the mobile communication terminal with the IMS. The mobile communication terminal also includes a session module that initiates the set-up of the session with the IMS. At least one of the registration module and the session module provide the first IP address to the IMS. The mobile communication terminal communicates with a first PDN that is local to the visited network using the first IP address in order to use the at least one of the IMS resources.

In other features, the mobile communication terminal includes an attachment module that initiates attachment to the home network through the visited network when the mobile communication terminal is roaming. The mobile communication terminal also includes a response module. The response module receives a response from the home network during the attachment to the home network that indicates that the mobile communication terminal is permitted to connect remotely to the first PDN using the first IP address.

In other features, the mobile communication terminal further includes an analysis module. The analysis module analyzes signals from the IMS that indicate whether the mobile communication terminal is permitted to communicate with the first PDN to use the at least one of the IMS resources. The mobile communication terminal further includes a request module that requests use of the at least one of the IMS resources during at least one of the registration and the set-up of the session. The network system also includes memory that stores a profile of the mobile communication terminal. The profile includes at least one of a type of the mobile communication terminal and a capability of the mobile communication terminal. The capability includes a restriction that limits use of the first PDN.

In other features, the selection module selectively rejects use of the first IP by the mobile communication terminal based on the profile. The mobile communication terminal further includes a cellular network interface and a network interface. The mobile communication terminal communicates with the visited network via at least one of the cellular network interface and the network interface. The home network includes a second PDN gateway that communicates with a second PDN and that provides a second IP address to the mobile communication terminal.

In other features, the visited network includes at least one attachment point. The mobile communication terminal communicates with the visited network through the attachment point. The attachment point includes at least one of a Universal Mobile Telecommunications System (UMTS), a Long Term Evolution (LTE) Radio Access Network (RAN) and an Evolved Universal Terrestrial Radio Access Network (EU-TRAN).

In other features, a method for operating a mobile communication terminal includes initiating a registration of the mobile communication terminal with IMS within a home network. Registration is initiated when the mobile communication terminal is roaming in a visited network. The method also includes initiating a session set-up with the IMS to enable use of IMS resources. The method also includes providing a first IP address to the IMS during at least one of the registration and the session set-up. The method also includes communicating with a first packet data network (PDN) that is local to the visited network using the first IP address in order to use at least one of the IMS resources.

In other features, the method includes initiating connectivity with the home and visited networks prior to the registration. The method also includes receiving the first IP address based on the connectivity with the visited network. The method also includes receiving a second IP address that differs from the first IP address based on the connectivity with the home network. The method also includes receiving a second IP address from the IMS that differs from the first IP address.

In other features, the method includes receiving the second IP address during at least one of the registration and the session set-up. The method also includes selecting the first IP address. The method also includes receiving the second IP address prior to receiving the first IP address. The method also includes determining that the first PDN is permitted to use the at least one of the IMS resources based on IMS signals. The method also includes requesting use of the at least one of the IMS resources during at least one of the registration and the session set-up. The method also includes initiating attachment to the home network through the visited network when the mobile communication terminal is roaming.

In other features, the method includes receiving a response from the home network during the attachment to the home network that indicates that the mobile communication terminal is permitted to selectively connect remotely to the first PDN through the visited network. The method also includes remotely connecting to the first PDN through the visited network following the attachment to the home network. The method also includes indicating via the response that the mobile communication terminal has permission to selectively connect remotely to a second PDN through the home network.

In other features, the method includes storing a profile of the mobile communication terminal. The profile includes at least one of a type of the mobile communication terminal and a capability of the mobile communication terminal. The capability includes a restriction that limits use of the first PDN. The method also includes including exchanges in the registration between the mobile communication terminal and the IMS using Session Initiation Protocol (SIP) messages. The method also includes providing the first IP address for communications between the mobile communication terminal and the first PDN. The method also includes providing a second IP address for communications between the mobile communication terminal and the second PDN.

In other features, the method includes selecting a first one of a plurality of PDNs. The plurality of PDNs includes the first PDN and the at least one of the IMS resources. The method also includes providing the mobile communication terminal with the selection. The method also includes rejecting the selection. The method also includes providing an alternative selection to the IMS that includes a second one of the plurality of PDNs.

In other features, a method for operating an Internet protocol IMS of a home network system includes controlling a registration of a mobile communication terminal with the IMS. Registration is controlled when the mobile communication terminal is roaming in a visited network. The method also includes controlling a set-up of a session with the mobile communication terminal to enable use of IMS resources. The method also includes receiving a request from the mobile communication terminal to use at least one IMS resource via a first IP address during at least one of the registration and the set-up of the session. The method also includes rejecting the first IP address for use of the at least one IMS resource.

In other features, the method includes transmitting a second IP address to the mobile communication terminal during at least one of the registration and the set-up of the session. The second IP address differs from the first IP address. The method also includes exchanging data between the mobile communication terminal and the IMS using Session Initiation Protocol (SIP) messages during the registration. The method also includes selecting a first one of a plurality of PDNs that includes the at least one of the IMS resources. The plurality of PDNs includes the first PDN. The method also includes receiving a rejection from the mobile communication terminal of the selection.

In other features, the method includes receiving an alternative selection from the mobile communication terminal that includes a second IP address for a second one of the plurality of PDNs. The method also includes communicating with a first PDN that is local to the visited network using the first IP address in order to use the at least one of the IMS resources. The method also includes initiating attachment to the home network through the visited network when the mobile communication terminal is roaming. The method also includes receiving a response from the home network during the attachment to the home network that indicates that the mobile communication terminal is permitted to connect remotely to the first PDN using the first IP address.

In other features, the method includes analyzing signals from the IMS that indicate whether the mobile communication terminal is permitted to communicate with the first PDN to use the at least one of the IMS resources. The method also includes requesting use of the at least one of the IMS resources during at least one of the registration and the set-up of the session. The method also includes storing a profile of the mobile communication terminal. The profile includes at least one of a type of the mobile communication terminal and a capability of the mobile communication terminal. The capability includes a restriction that limits use of the first PDN. The method also includes selectively rejecting use of the first IP by the mobile communication terminal based on the profile.

In other features, a mobile communication terminal includes registration means for initiating a registration of the mobile communication terminal with multimedia means for using resources within a home network. The registration means initiates registration when the mobile communication terminal is roaming in a visited network. The mobile communication terminal also includes session means for initiating a session set-up with the multimedia means to enable use of multimedia means resources. At least one of the registration means and the session means provide a first IP address to the multimedia means during at least one of the registration and the session set-up. The mobile communication terminal communicates with a first packet data network (PDN) that is local to the visited network using the first IP address in order to use at least one resource of the multimedia means.

In other features, the mobile communication terminal also includes connection means for initiating connectivity with the home and visited networks prior to the registration. The mobile communication terminal also includes reception means for receiving the first IP address based on the connectivity with the visited network. The reception means receives a second IP address that differs from the first IP address based on the connectivity with the home network. The reception means receives a second IP address from the multimedia means that differs from the first IP address. The reception means receives the second IP address during at least one of the registration and the session set-up.

In other features, the mobile communication terminal includes analysis means for selecting the first IP address. The reception means receives the second IP address prior to receiving the first IP address. The analysis means determines that the first PDN is permitted to use the at least one resource of the multimedia means based on multimedia means signals. The mobile communication terminal also includes a request means that requests use of the at least one resource of the multimedia means during at least one of the registration and the session set-up. The mobile communication terminal also includes attachment means for initiating attachment to the home network through the visited network when the mobile communication terminal is roaming.

In other features, the mobile communication terminal includes response means for receiving a response from the home network during the attachment to the home network that indicates that the mobile communication terminal is permitted to selectively connect remotely to the first PDN through the visited network. The mobile communication terminal remotely connects to the first PDN through the visited network following the attachment to the home network. The response indicates that the mobile communication terminal has permission to selectively connect remotely to a second PDN through the home network.

In other features, the mobile communication terminal includes means for storing a profile of the mobile communication terminal. The profile includes at least one of a type of the mobile communication terminal and a capability of the mobile communication terminal. The capability includes a restriction that limits use of the first PDN. The mobile communication terminal also includes cellular network interface means for communicating and network interface means for communicating. The mobile communication terminal communicates with the visited network via at least one of the cellular network interface means and the network interface means. The registration includes exchanges between the mobile communication terminal and the multimedia means using Session Initiation Protocol (SIP) messages.

In other features, a network system includes the mobile communication terminal, the home network that includes the multimedia means, and the visited network. The visited network includes first gateway means for communicating with the first PDN. The home network includes second gateway means for communicating with a second PDN. The first gateway means provides the first IP address for communications between the mobile communication terminal and the first PDN. The second gateway means provides a second IP address for communications between the mobile communication terminal and the second PDN. The visited network includes at least one attachment point means for attaching.

In other features, the mobile communication terminal communicates with the visited network through the attachment point means. The attachment point means includes at least one of a Universal Mobile Telecommunications System (UMTS), a Long Term Evolution (LTE) Radio Access Network (RAN) and an Evolved Universal Terrestrial Radio Access Network (EUTRAN. The multimedia means includes control means for selecting a first one of a plurality of PDNs. The plurality of PDNs includes the first PDN and the at least one resource of the multimedia means. The multimedia means provides the mobile communication terminal with the selection. The mobile communication terminal rejects the selection and provides an alternative selection to the multimedia means that includes a second one of the plurality of PDNs.

In other features, an Internet protocol (IP) multimedia subsystem (IMS) of a home network system includes registration means for controlling a registration of a mobile communication terminal with the IMS when the mobile communication terminal is roaming in a visited network. The IMS also includes session means for controlling a set-up of a session with the mobile communication terminal to enable use of IMS resources. The IMS also includes selection means for receiving a request from the mobile communication terminal to use at least one IMS resource via a first IP address.

In other features, the selection means receives the request during at least one of the registration and the set-up of the session. The selection means rejects the first IP address for use of the at least one IMS resource. The IMS also includes transmission means for transmitting a second IP address to the mobile communication terminal during at least one of the registration and the set-up of the session. The second IP address differs from the first IP address. The registration includes exchanges between the mobile communication terminal and the IMS using Session Initiation Protocol (SIP) message. The selection means selects a first one of a plurality of PDNs that includes the at least one of the IMS resources.

In other features, the plurality of PDNs includes the first PDN. The selection means provides the mobile communication terminal with the selection. The selection means receives a rejection from the mobile communication terminal of the selection and further receives an alternative selection from the mobile communication terminal that includes a second IP address for a second one of the plurality of PDNs.

In other features, a network system includes the IMS, the mobile communication terminal and the visited network. The visited network includes first gateway means for providing the first IP address to the mobile communication terminal. The mobile communication terminal also includes registration means for initiating the registration of the mobile communication terminal with the IMS. The mobile communication terminal also includes session means for initiating the set-up of the session with the IMS. At least one of the registration means and the session means provide the first IP address to the IMS. The mobile communication terminal communicates with a first PDN that is local to the visited network using the first IP address in order to use the at least one of the IMS resources.

In other features, the mobile communication terminal includes attachment means for initiating attachment to the home network through the visited network when the mobile communication terminal is roaming. The mobile communication terminal also includes response means for receiving a response. The response means receives the response from the home network during the attachment to the home network that indicates that the mobile communication terminal is permitted to connect remotely to the first PDN using the first IP address.

In other features, the mobile communication terminal further includes analysis means for analyzing. The analysis means analyzes signals from the IMS that indicate whether the mobile communication terminal is permitted to communicate with the first PDN to use the at least one of the IMS resources. The mobile communication terminal further includes request means for requesting use of the at least one of the IMS resources during at least one of the registration and the set-up of the session. The network system also includes means for storing a profile of the mobile communication terminal. The profile includes at least one of a type of the mobile communication terminal and a capability of the mobile communication terminal. The capability includes a restriction that limits use of the first PDN.

In other features, the selection means selectively rejects use of the first IP by the mobile communication terminal based on the profile. The mobile communication terminal further includes cellular network interface means for communicating and network interface means for communicating. The mobile communication terminal communicates with the visited network via at least one of the cellular network interface means and the network interface means. The home network includes second gateway means for communicating with a second PDN and that provides a second IP address to the mobile communication terminal.

In other features, the visited network includes at least one attachment point means for attaching. The mobile communication terminal communicates with the visited network through the attachment point means. The attachment point means includes at least one of a Universal Mobile Telecommunications System (UMTS), a Long Term Evolution (LTE) Radio Access Network (RAN) and an Evolved Universal Terrestrial Radio Access Network (EUTRAN).

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
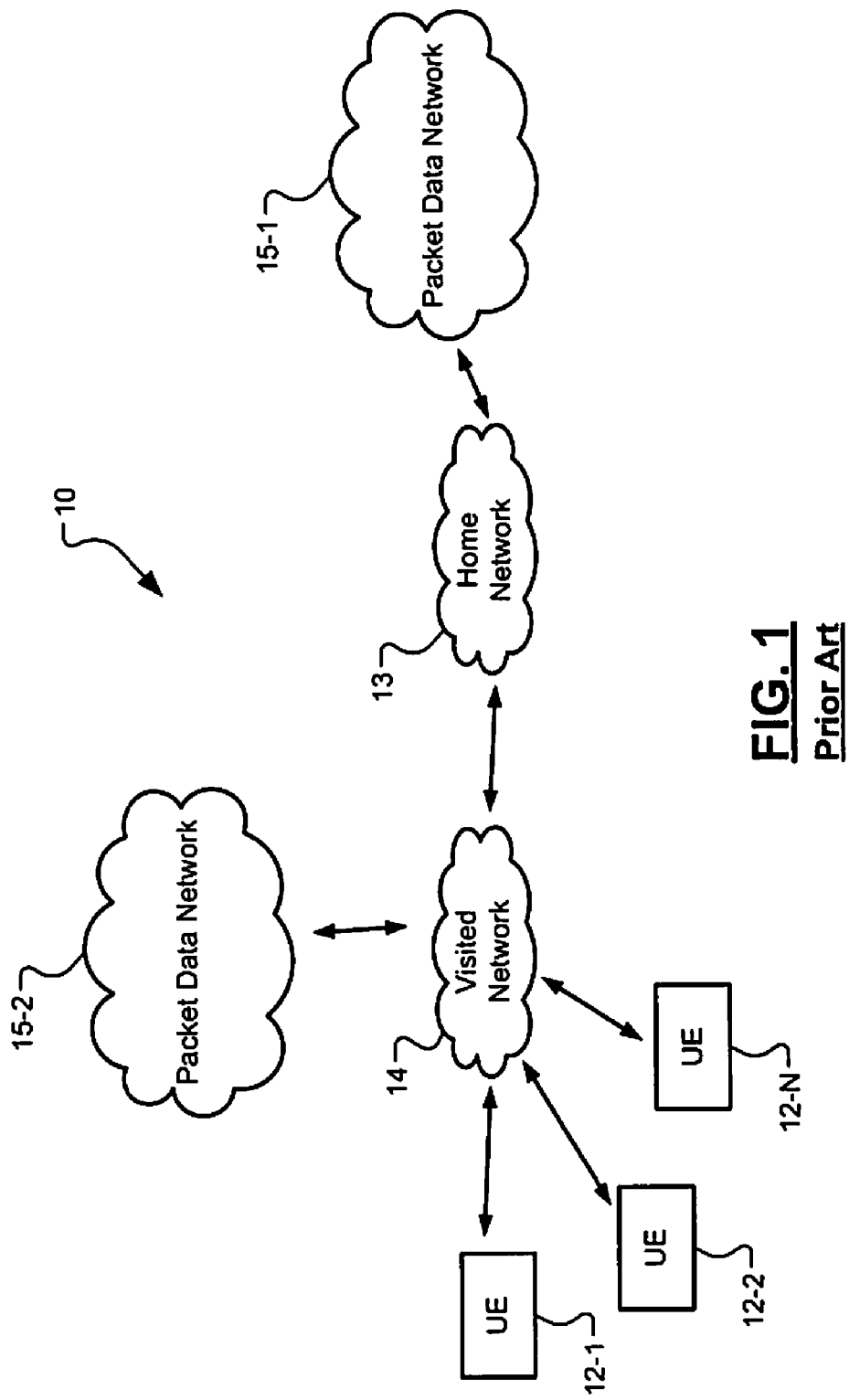
FIGS. 1-2 are functional block diagrams of an exemplary network system according to the prior art.
Figure 2:
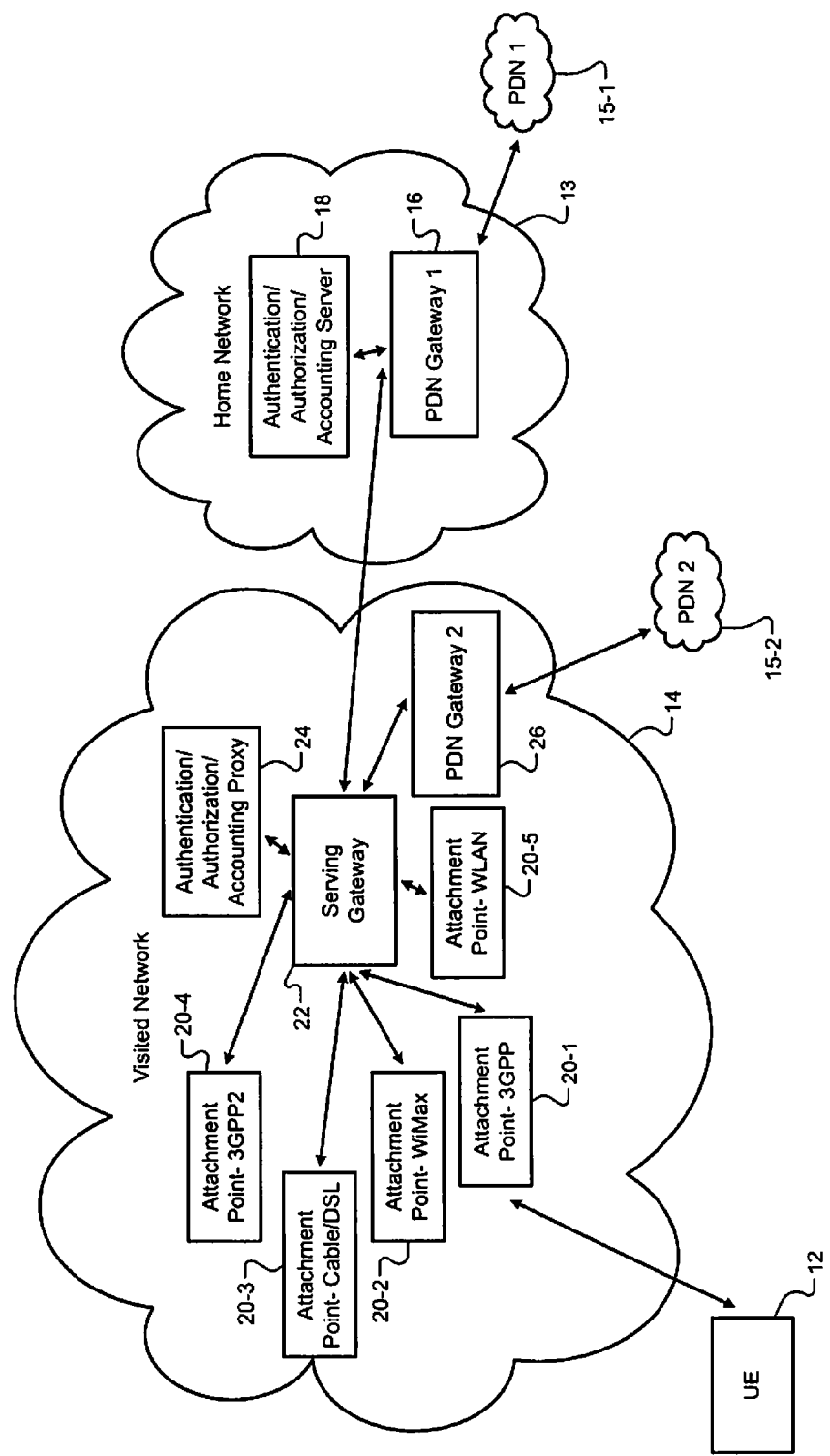
Figure 3:
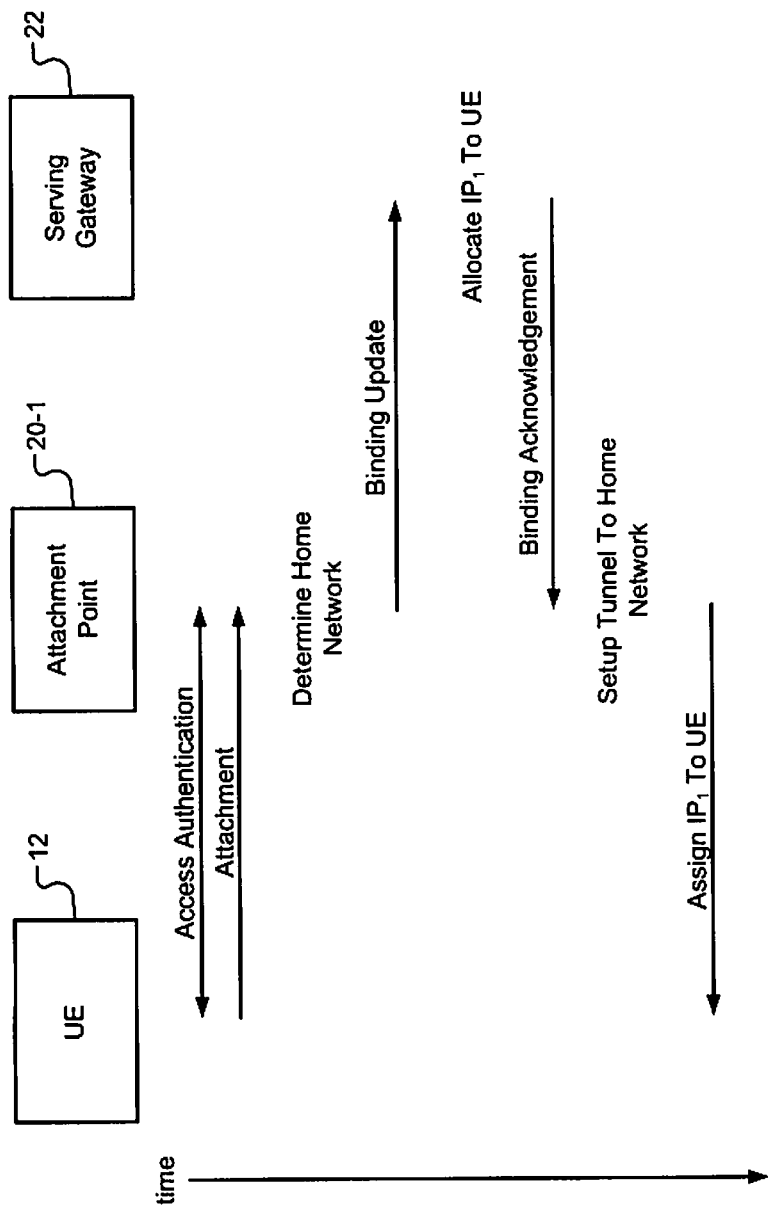
FIG. 3 is a timeline that illustrates connection of a terminal to a home network according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A mobile terminal may be attached to a home network and may connect with a first gateway of the home network. The mobile terminal may receive a first Internet protocol (IP) address from the first gateway when connecting. The home network may include IP multimedia subsystems (IMS) that communicate with a first packet data network (PDN) such as the Internet via the first gateway. The mobile terminal may initially register with the IMS and then may set-up individual sessions for respective uses of IMS resources. A set-up session may be referred to as media connectivity wherein IMS resources are enabled for use by the mobile terminal. The IMS resources may include, for example, services relating to voice and video communications.

When roaming, the mobile terminal may attach to the home network via a visited network. The visited network may communicate with a second PDN through a second gateway. The mobile terminal receives a second IP address when connecting with the second gateway. Connection procedures may occur following attachment when the mobile terminal requires a resource in the visited or home network. The roaming mobile terminal may connect with the first and second PDNs through the first and second gateways using the first and second IP addresses, respectively. The first and second PDNs may or may not overlap.

Previously, the mobile terminal initiated communications by attaching to the home network via the visited network and registering with the IMS in the home network. The mobile terminal then connected to the first PDN to use IMS resources even though network resources could have been spared had the mobile terminal connected to the second PDN to use IMS resources instead.

In the present disclosure, the mobile terminal and the IMS determine which PDNs the mobile terminal may connect with in order to use IMS resources. Determinations are made during IMS registration and/or during one or more IMS session set-ups. The mobile terminal and/or home network may pre-determine specific PDNs for use of specific IMS resources and/or may determine the closest PDN to the mobile terminal that can supply the requested services. Communications between the mobile terminal and resources within the visited network may be referred to as local breakout.

For example, the mobile terminal may register with and inform the IMS that the mobile terminal has set-up IP connectivity in a manner that supports local breakout. The mobile terminal may therefore provide an indication to the IMS that local breakout is supported and may also provide a relevant IP address, such as the second IP address, that was obtained in the visited network for the local breakout. The mobile terminal may provide the second IP address in the registration procedure or in a session set-up procedure with the IMS. The IMS may inform the mobile terminal that the second IP address selected for media connectivity is not acceptable and that a service, for example a terminal-to-terminal call, cannot be used based on the second IP address. For use of IMS resources, the IMS and mobile terminal may then negotiate an alternative IP address that corresponds to a different PDN.

Figure 4:
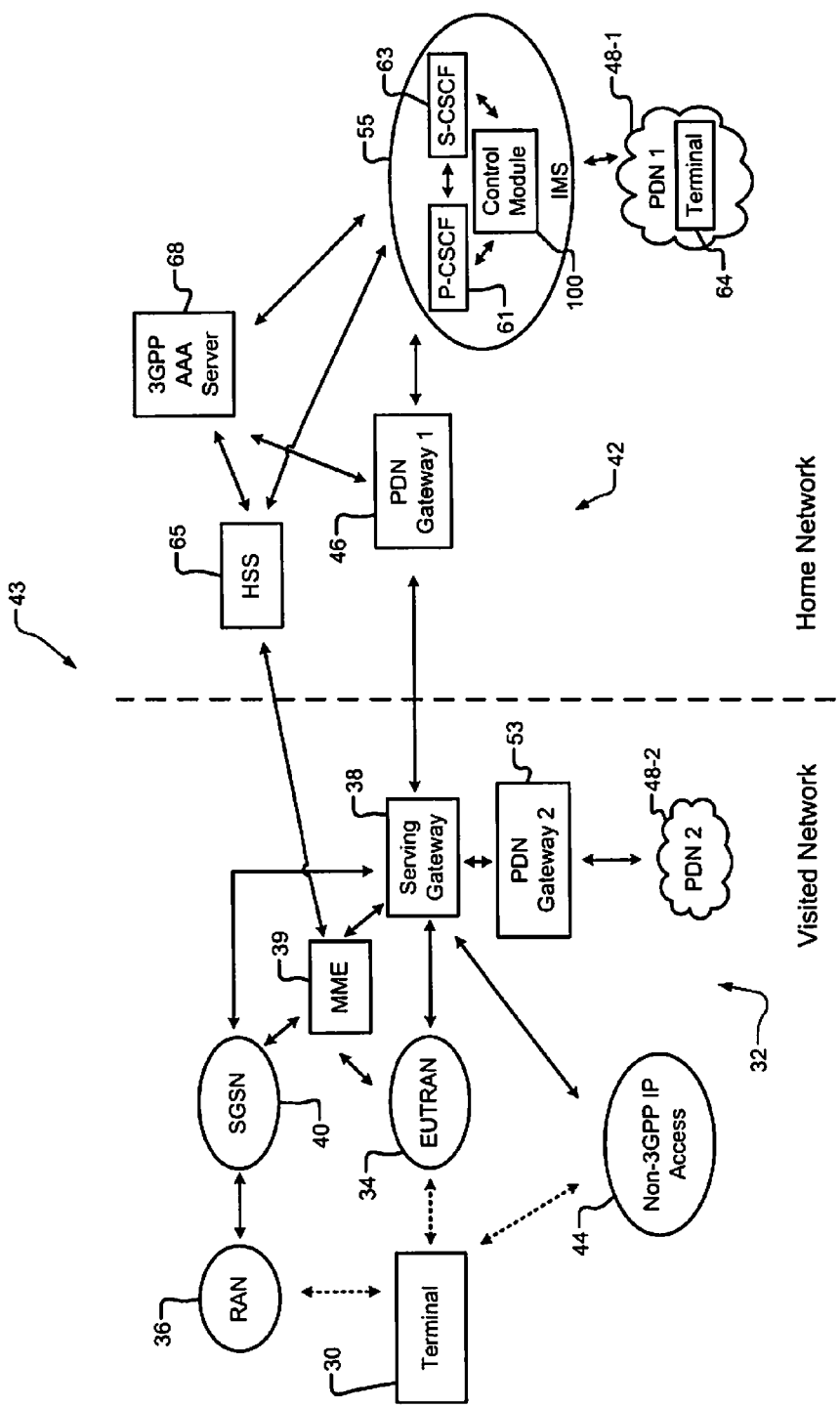
FIG. 4 is a functional block diagram of an exemplary network system according to the present disclosure.

Referring now to FIG. 4, a mobile terminal 30 attaches to an exemplary visited network 32 through one of a plurality of attachment points. The attachment points may include a radio access network 34, such as an Evolved Universal Terrestrial Radio Access Network (EUTRAN) or a Long Term Evolution (LTE) radio access network (RAN) 36. The mobile terminal 30 may communicate with the visited network 32 and home network 42 via the EUTRAN 34 and/or the RAN 36.

The home network 42 may include a home public land mobile network (HPLMN), and the visited network 32 may include a visited public land mobile network (VPLMN) of a 3$^{rd}$ Generation Partnership Project (3GPP™) network system 43. An exemplary home network 42 communicates with one or more visited networks.

The mobile terminal 30 may alternatively be located in a non-3GPP™ network, such as a wireless local area network (WLAN) network or Worldwide Interoperability for Microwave Access (WiMAX) network. The non-3GPP™ network may communicate with the visited network 32 and home network 42 via non-3GPP™ attachment points, which are generally identified as 44. Any of the attachment points may communicate according to any of IEEE standards 802.11, 802.11a, 802.11b, 802.11g, 802.11h, 802.11n, 802.16, and 802.20, which are incorporated herein by reference in their entirety.

The visited network 32 also includes a serving gateway 38 and a mobility management entity (MME) 39 that may include a 3GPP™ authentication, authorization and accounting (AAA) proxy. The visited network 32 may also include a servicing general packet radio service support node (SGSN) 40.

The mobile terminal 30 may establish IP connectivity with a first PDN gateway 46 of the home network 42 to receive IMS resources from a first IP multimedia network, such as the PDN 48-1. The resources may include real-time and non-real-time resources, such as Web browsing, voice over Internet phone (VoIP), electronic mail (email), real-time IP multimedia, and conversational and streaming resources.

However, the visited network 32 may also be able to provide at least some of the IP resources that the mobile terminal 30 requires from a second PDN 48-2 associated with the visited network 32. Therefore, the mobile terminal 30 may also establish IP connectivity with a second PDN gateway 53 of the visited network 32 to receive available IP resources from the second PDN 48-2.

The serving gateway 38 of the visited network 32 may be a system architecture evolution (SAE) gateway or a wireless access gateway (WAG). The serving gateway 38 may provide a different IP address for each PDN 48-1, 48-2 from the respective gateways 16, 26. The mobile terminal 30 may therefore receive a first IP address ($IP_1$) from the first PDN gateway 46 to communicate with PDN 48-1 and a second IP address ($IP_2$) from the second PDN gateway 53 to communicate with PDN 48-2.

The home network 42 also includes the IMS 55 that includes an architectural framework for delivering IP multimedia to the mobile terminal 30 from the PDNs 48-1, 48-2. The IMS 55 includes various devices that support multimedia exchanges that may be referred to as proxy servers. Proxy servers are servers, such as computer systems or application programs that service requests of the mobile terminal 30 by forwarding requests to other servers within the PDN 48-1. Exemplary proxy servers include a proxy Call Session Control Function (P-CSCF) 61 and a serving-Call Session Control Function (S-CSCF) 63. The PDN gateway 46 may communicate with a first PDN 48-1 via the IMS 55. The proxy servers, P-CSCF 61 and S-CSCF 63, may generally be referred to as IMS sub-control modules.

The P-CSCF 61 may receive and inspect all messages received in the IMS 55. The P-CSCF 61 may also authenticate and establish security for the mobile terminal 30 with regard to the IMS 55. The P-CSCF 61 may forward registration messages and session establishment messages to the home network 42 from the mobile terminal 30. The P-CSCF 61 may also authorize IMS resources, control quality of service and manage IMS bandwidth.

The S-CSCF 63, which may also be referred to as a registration module, sets up an IMS session and handles requests for use of multimedia delivered from the mobile terminal 30. Requests for use of multimedia may include registration of the mobile terminal 30 with the IMS 55 via Session Initiation Protocol (SIP) messages. SIP includes an application-layer control protocol for creating, modifying, and terminating sessions between two participants, such as the mobile terminal 30 and a device within the PDN 48-1. An example of a device within the PDN 48-1 is another terminal 64. An exemplary SIP registration is specified in 3GPP TS 23.228, which is incorporated herein by reference in its entirety.

SIP communications used in creation of sessions for media usage may be referred to as SIP signaling communications. Communications that involve the actual usage of IMS media may be referred to as SIP media signals. Previously, the IMS 55 allowed use of a different IP address for SIP signaling and for SIP media. The IMS 55 therefore was often not able to determine whether a terminal was attempting to set-up an IMS call using local breakout. In the present disclosure, the same IP address may be used for both SIP signaling and SIP media.

To provide a service at the request of the mobile terminal 30, the S-CSCF 63 delivers a SIP message to other entities in communication with the IMS 55, such as the terminal 64 in the PDN 48-1. The S-CSCF 63 performs session management for the IMS 55. The S-CSCF 63 handles SIP messages, which allow it to bind the location of the mobile terminal 30 (for example, the terminal IP address) and a SIP address. The SIP address may correspond to a location of a device in one of the PDNs. Basically, the S-CSCF 63 determines to which device(s) SIP messages may be forwarded in order to provide resources requested by the mobile terminal 30.

Figure 5:
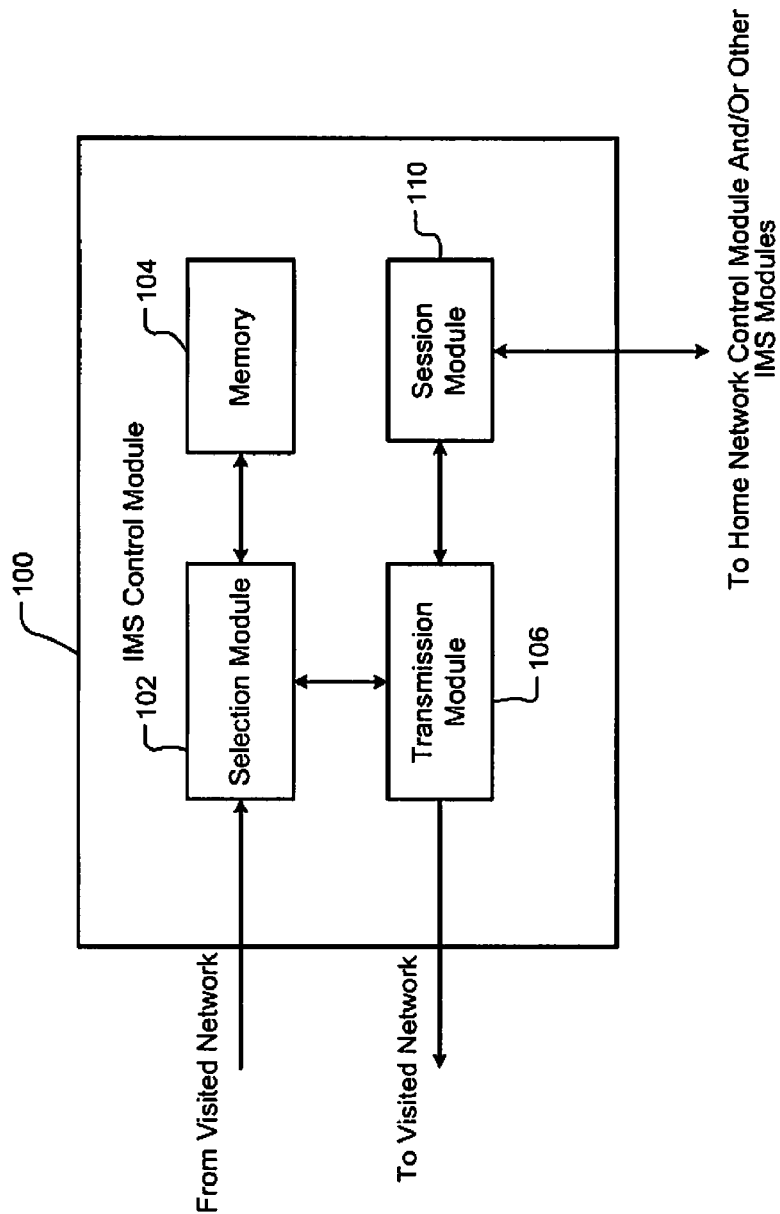
FIG. 5 is a functional block diagram of a control module for a multimedia subsystem according to the present disclosure.

Referring now to FIG. 5, the IMS 55 may also include an IMS control module 100 that communicates with the P-CSCF 61 and S-CSCF 63. Alternatively, the IMS control module 100 may be distributed throughout the IMS 55 and at least in part throughout the P-CSCF 61 and S-CSCF 63. The IMS control module 100 may include a selection module 102 that determines whether the IMS 55 supports local breakout for the mobile terminal 30. The selection module 102 may, for example, analyze a terminal profile that includes subscription information for the mobile terminal 30. The terminal profile may be stored in home network memory and may indicate that the mobile terminal 30 may perform local breakout in a visited network 32.

The selection module 102 may also determine whether the IP address provided by the mobile terminal 30 for routing of the SIP signaling is different from an address provided in a Session Description Protocol (SDP) descriptor. An SDP descriptor includes parameters that describe the SIP session and may include designated IP addresses that may be used to address the media of the IMS 55. SIP may act as a carrier for the SDP, which describes the media content of the session, such as what IP addresses to use, the codec being used, etc.

If the selection module 102 determines that the mobile terminal IP address differs from addresses in the SDP descriptor, the selector module 102 may inform the mobile terminal 30 that the mobile terminal requires a different IP address to use IMS resources. In other words, the home and/or visited networks 42, 32 may detect which routing the mobile terminal 30 is attempting to use for each IMS session set-up. The selection module 102 may provide an indication to the mobile terminal 30 where the IMS traffic may be routed so that the mobile terminal 30 does not implement routing that conflicts with policies of the network system 43. For example, the terminal 30 may connect to the second PDN 48-2 and then inform the IMS 55 that IMS services should be routed through the second PDN 48-2. The selection module 102 may allow the routing through the second PDN 48-2 if the routing is permitted.

Further, the selection module 102 may analyze an IP address provided by the mobile terminal 30. For example, the mobile terminal 30 may provide $IP_2$. The selection module 102 may determine that $IP_2$ is an address to a PDN that does not include and/or support IMS resources. The unsupported IMS resources may include all IMS resources or merely the services requested by the mobile terminal 30. The selection module 102 may make the determination based, for example, signals from the S-CSCF 63 that indicate to which device(s) SIP messages may be forwarded to provide requested resources.

The selection module 102 may receive signals from the mobile terminal 30 that indicate that connectivity has been set up between the mobile terminal 30 and the second PDN 48-2 for local breakout. The connectivity signals may also include $IP_1$ and/or $IP_2$. The signals may be received during SIP registration and/or during an IMS session set-up. The IMS control module 100 may include memory 104 that stores local breakout information from the connectivity signals, such as IP addresses (for example, $IP_2$) provided by the mobile terminal 30.

The selection module 102 may alternatively receive signals from the mobile terminal 30 that indicate whether the mobile terminal 30 prefers local breakout. For example, the mobile terminal 30 may include a user input that allows selection of local breakout when the mobile terminal 30 is roaming. As another example, the mobile terminal 30 may determine that IMS resources may be found in a PDN, such as the second PDN 48-2, and therefore selectively indicate to the IMS 55 that the mobile terminal 30 prefers local breakout. The mobile terminal 30 may provide the local breakout preference signals during or after SIP registration and prior to or during an IMS session set-up between the mobile terminal 30 and the IMS 55. The mobile terminal 30 may also provide local breakout preference signals during each IMS session set-up. In other words, the routing of IMS traffic may be different on a per-session basis. The selection module 102 may therefore determine whether local breakout may be supported for each IMS session.

The IMS control module 100 may also include a transmission module 106 that responds to the terminal connectivity, SIP registration and/or IMS set-up signals when the signals indicate local breakout is preferred and/or supported. Transmission module signals may be based on selection module signals. The transmission module 106 may therefore provide an indication to the mobile terminal 30 whether the IMS 55 and/or the network system 43 supports local breakout for the mobile terminal 30. The transmission module 106 may also provide one or more alternatives for the mobile terminal 30 when local breakout is not supported for the mobile terminal 30. The selection module 102 may select the alternatives from a plurality of PDNs. An example of an alternative for the mobile terminal 30 includes other PDNs within the visited network 32.

The IMS control module 100 may also include a session module 110 that provides an indication to the mobile terminal 30 via the transmission module 106 whether local breakout is supported. The indication may be provided prior to the mobile terminal 30 setting up SIP registration or requesting local breakout. The session module 110 may receive signals from the mobile terminal 30 and/or other network components, such as the PDN gateways 46, 53 that indicate that connectivity has been established. The session module 110 may analyze the connectivity indications and transmit a signal to the mobile terminal 30 via the transmission module 106 based on various network parameters. Network parameters may include terminal profiles and IMS resource availability within the PDNs 48-1, 48-2 among others. For example, if bandwidth for all IMS resources is utilized in one or more of the PDNs 48-1, 48-2, the session module indication may include an indication that local breakout should be delayed or should not be permitted.

The mobile terminal 30 may accept or reject the local breakout indication from the session module 110. If the mobile terminal 30 rejects the indication, the mobile terminal 30 may provide an alternative, such as an IP address for a different PDN associated with the visited network 32 via a different PDN gateway. The mobile terminal 30 may also wait a predetermined time and then attempt to set-up an IMS session using local breakout.

The mobile terminal 30 may acquire connectivity with multiple PDN gateways, such as the first and second PDN gateways 46, 53. The mobile terminal 30 may then perform SIP registration. As part of the SIP registration, the mobile terminal 30 may provide an indication to the IMS 55 that local breakout is supported. The mobile terminal 30 may also provide the IMS 55 with the IP address obtained in the visited network for the local breakout of the IMS media.

Alternatively, the IMS 55 may inform the mobile terminal 30 that the IP address selected by the mobile terminal 30 for media connectivity is not acceptable and that the IMS services may not be used with the IP address. For example, the IMS 55 may provide the aforementioned information when the mobile terminal 30 sets up an IMS session and provides $IP_1$ and/or $IP_2$ to the IMS 55. The IMS 55 may also inform the mobile terminal 30 during a session set-up. An exemplary session includes the mobile terminal 30 attempting to gain connectivity to the visited network 32 in order to obtain access to IMS controlled services. Further, the IMS 55 may indicate whether local breakout may be supported for a particular session in a session establishment message. The session establishment message may be provided during a session set-up and may indicate that an IMS session has been successfully set-up. The mobile terminal 30 may accept the indication or request to either use local breakout anyway or to use IMS resources in a PDN of the home network 42.

Referring again to FIG. 4, the MME 39 may communicate with each of the UETRAN 34, the RAN 36, the serving gateway 38, and the SGSN 40. The MME 39 performs terminal tracking and security functions. For example, the MME 39 manages and stores terminal information. The MME 39 also generates temporary IDs. and allocates them to the mobile terminal 30. The MME 39 also may perform authentication, authorization and accounting services in the visited network 32. The serving gateway 38 is in communication with the RAN 36 the PDN gateway 46, and the SGSN 40. The SGSN 40 may be responsible for packet routing and transfer and mobility management, which may include location management and attachment/detachment of the mobile terminal 30 to the visited network 32. The SGSN 40 may also control logical link management and may also act as an AAA proxy server.

The home network 42 may also include a home subscriber server (HSS) 65 that is in communication with an AAA server 68. The HSS 65 may consider each mobile terminal 30 as a subscriber to a PDN 15-1 and may include authentication and subscription data required for the mobile terminal 30 to access the PDN 48-1. The HSS 65 may also store an IP address of the AAA server 68 to which the mobile terminal 30 is registered. The HSS 65 may also perform PDN gateway selection. The HSS 65 interfaces with the S-CSCF 63 to provide information about the location of the mobile terminal 30 and terminal subscription information. The S-CSCF 63 interfaces with the HSS 65 and may download and upload user profiles.

The AAA server 68 provides AAA information and subscriber profile information. This information may be obtained from the HSS 65. For example, the AAA server 68 may authenticate the terminal subscription information with the HSS 65 after a request to communicate by the mobile terminal 30.

For example, when accessing the PDN gateway 46, the mobile terminal 30 generates and transmits an access authentication signal to the MME 39 via the RAN 36. The MME 39 generates and transmits an AAA request signal to the HSS 65 and/or the MA server 68. As part of an authentication procedure the HSS 65 and/or the AAA server 68 authenticate the mobile terminal 30 and select a PDN gateway. IP connectivity may then be established between the MME 39 and the PDN gateway 46. Following establishment of IP connectivity, an attachment procedure between the mobile terminal 30 and the MME 39 is completed. The mobile terminal 30 may register with a home agent (for example IMS 55) of the PDN gateway 46. The mobile terminal 30 then receives resources from the PDN 48-1 via the PDN gateway 46.

Figure 6A:
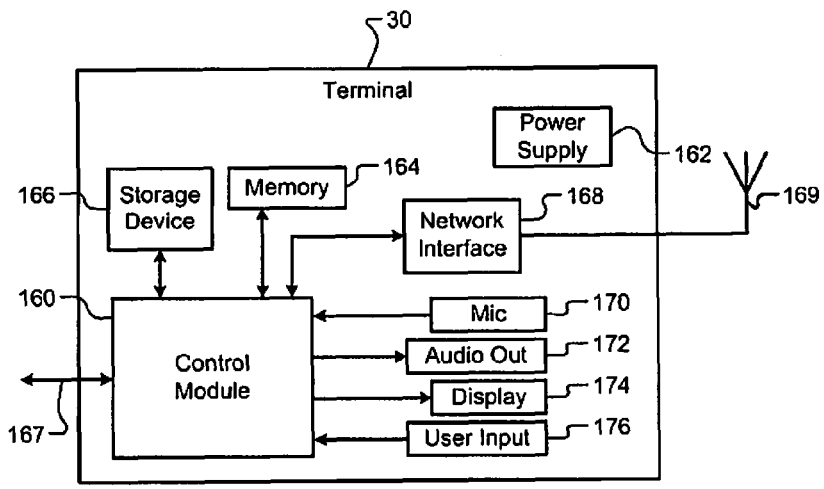
FIG. 6A is a functional block diagram of a mobile terminal according to the present disclosure.
Figure 6B:
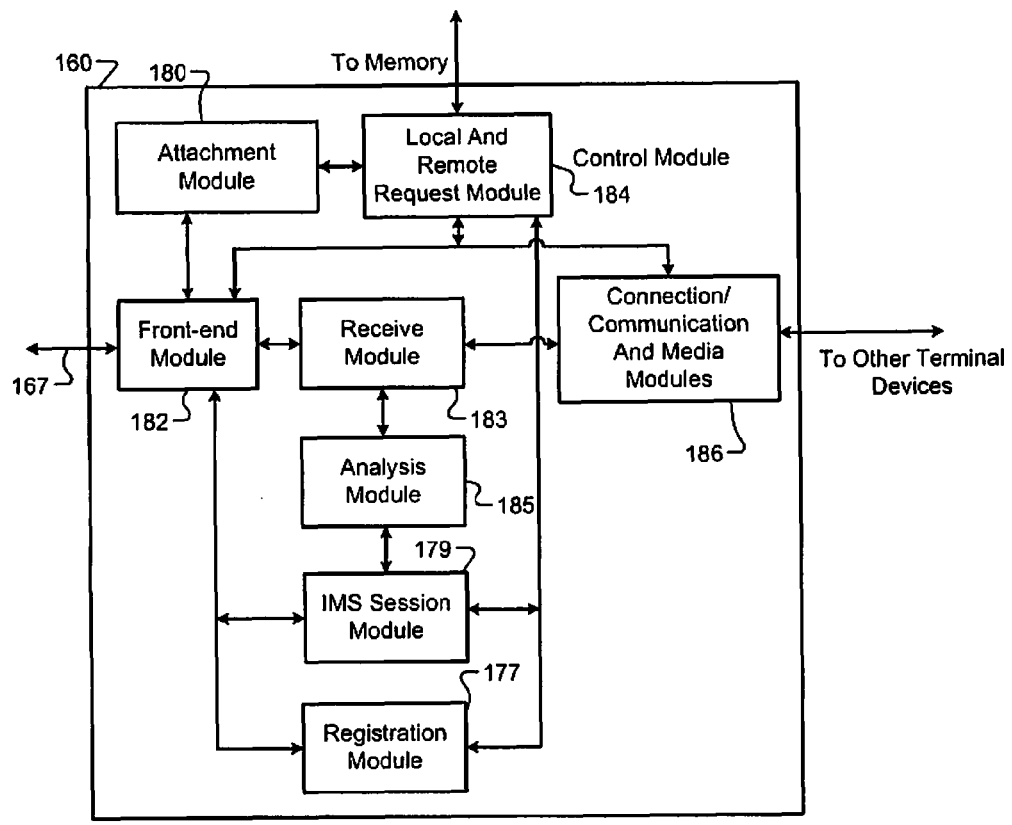
FIG. 6B is a functional block diagram of a control module for a mobile terminal according to the present disclosure.

Referring now to FIGS. 6A-6B, an example of a mobile terminal 30, which may include a cellular phone or other type of terminal, is illustrated. The mobile terminal 30 includes a control module 160, a power supply 162, memory 164, a storage device 166, and a cellular network interface 167. The mobile terminal 30 may include a network interface 168, a microphone 170, an audio output 172 such as a speaker and/or output jack, a display 174, and a user input device 176 such as a keypad and/or pointing device. If the network interface 168 includes a wireless local area network interface, an antenna 169 may be included.

The control module 160 may receive input signals from the cellular network interface 167, the network interface 168, the microphone 170, and/or the user input device 176. The control module 160 may process signals, including encoding, decoding, filtering, and/or formatting, and generate output signals. The output signals may be communicated to one or more of memory 164, the storage device 166, the cellular network interface 167, the network interface 168, and the audio output 172.

The memory 164 may store a terminal profile. The terminal profile may indicate the type of terminal and the capabilities of the mobile terminal 30. The capabilities of the mobile terminal 30 may include restrictions to predetermined PDNs and/or devices within predetermined PDNs. The memory 164 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 166 may include an optical storage drive, such as a DVD drive, and/or a hard disk drive (HDD). The power supply 162 provides power to the components of the mobile terminal 30.

The control module 160 may include an attachment module 180 that initiates attachment and authentication procedures via a front-end module 182. The request module 184 may request use of local and home resources, such as resources in the first and/or second PDNs 48-1, 48-2. The request module 184 may therefore request access to both PDNs 48-1, 48-2 during attachment procedures of the attachment module 180.

Alternatively, the request module 184 may request use of resources in either or both the PDNs 48-1, 48-2 during another procedure, such as IMS registration (before or during SIP exchanges) and/or at the set-up of each IMS session. The control module 160 may receive responses from the home network 42 in a receive module 183 that indicate that the mobile terminal 30 may connect with the first and/or second PDNs 48-1, 48-2. The responses may include respective IP addresses for the connections, however, the IP addresses may be initially provided by PDN gateways 46, 53 in the respective networks. Authorization to use the first and/or second PDNs 48-1, 48-2 may be provided from the home network 42 independent of connections with the PDNs 48-1, 48-2.

The control module 160 may also include a registration module 177 and an IMS session module 179. The registration module 177 registers with the IMS 55 for use of IMS resources using, for example, SIP registration signals. The IMS session module 179 sets-up and maintains IMS sessions following SIP registration when the mobile terminal 30 requires use of IMS resources. A request module 184 may request local breakout in the visited network 32 during one or both of SIP registration and IMS session set-up. The request module 184 may also provide the IP address (for example IN of the PDN with which the mobile terminal 30 intends to locally breakout. In other words, the IMS 55 may restrict local breakout even if local breakout is allowed by the home and/or visited networks 32, 42.

The IMS 55 may also provide an alternative for the mobile terminal 30 in the event that the IMS 55 restricts local breakout. An example of an alternative includes requiring the mobile terminal 30 to connect to a PDN in the visited network 32 that is different than the PDN 48-2 with which the mobile terminal 30 connected. Another example of an alternative includes requiring the mobile terminal 30 to connect to a PDN in the home network 42. The analysis module 185 may accept the alternative. However, if the analysis module 185 rejects the alternative, the request module 184 may request use of still another PDN in the home or visited networks 32, 42 or may request to use the IMS resources at a later time. The analysis module 185 may reject the alternative when, for example, the mobile terminal 30 requires use of IMS resources immediately, and where routing to the home network 42 would provide substantial delay.

For example, IMS resources may include emergency services, such as police, fire, and/or medical services. The analysis module 185 may recognize the type of services and also recognize that the services should be provided by a PDN local to the visited network 32. Recognition of the type of services may be based on predetermined designators for various services. For example, the terminal 30 may include a list of services, such emergency services, and corresponding designators (such as the number 911) for the emergency services. When such a designator is input into the mobile terminal 30, the analysis module 185 may reject an indication from the IMS 55 that the mobile terminal 30 should route IMS services through a PDN of the home network 42. The analysis module 185 may retry the original IP address for the visited network PDN after a predetermined time or may try to initiate IMS routing through an alternative PDN in the visited network 32.

The analysis module 185 may attempt alternative routing of IMS resources through another PDN of the visited network 32 if the terminal 30 has found or is otherwise aware of the other PDN. For example, the terminal 30 may scan the visited network 32 for PDNs and may attempt to connect to any or all of the PDNs to acquire respective IP addresses for the PDNs. The terminal 30 may default to the closest PDN to use IMS resources but may alternatively attempt to use IMS resources in the other PDNs. For example, the mobile terminal 30 may use another PDN if the closest PDN lacks the requested resource, the resource is already being utilized and/or the terminal is not permitted to use IMS resources in the closest PDN.

The receive module 183 may receive signals from the IMS 55 that indicate whether local breakout is permitted for IMS resources. Local breakout for IMS resources may not be allowed when the IMS resources are in use and/or otherwise not available or not recognized in either or both of the PDNs 48-1, 48-2. Also, local breakout for IMS resources may not be allowed if a profile for the mobile terminal 30 indicates that the mobile terminal 30 may not connect to a visited PDN 48-2. The profile for the mobile terminal 30 may be stored in memory 164 within the mobile terminal 30 and/or in memory within the home network 42.

The control module 160 may also include an analysis module 185 that determines that the mobile terminal 30 is authorized to connect to the PDNs 48-1, 48-2 based on the response from the home network 42. The analysis module 185 may also determine whether the mobile terminal 30 may locally breakout (and thus use IMS resources within the PDN 48-2) based on signals from the IMS.

The control module 160 also includes connection, communications and media modules 186 that control connection between network devices and that provide control for various terminal devices. Examples of terminal devices include the network interface 168, the microphone 170, and/or the user input device 176.

Figure 7:
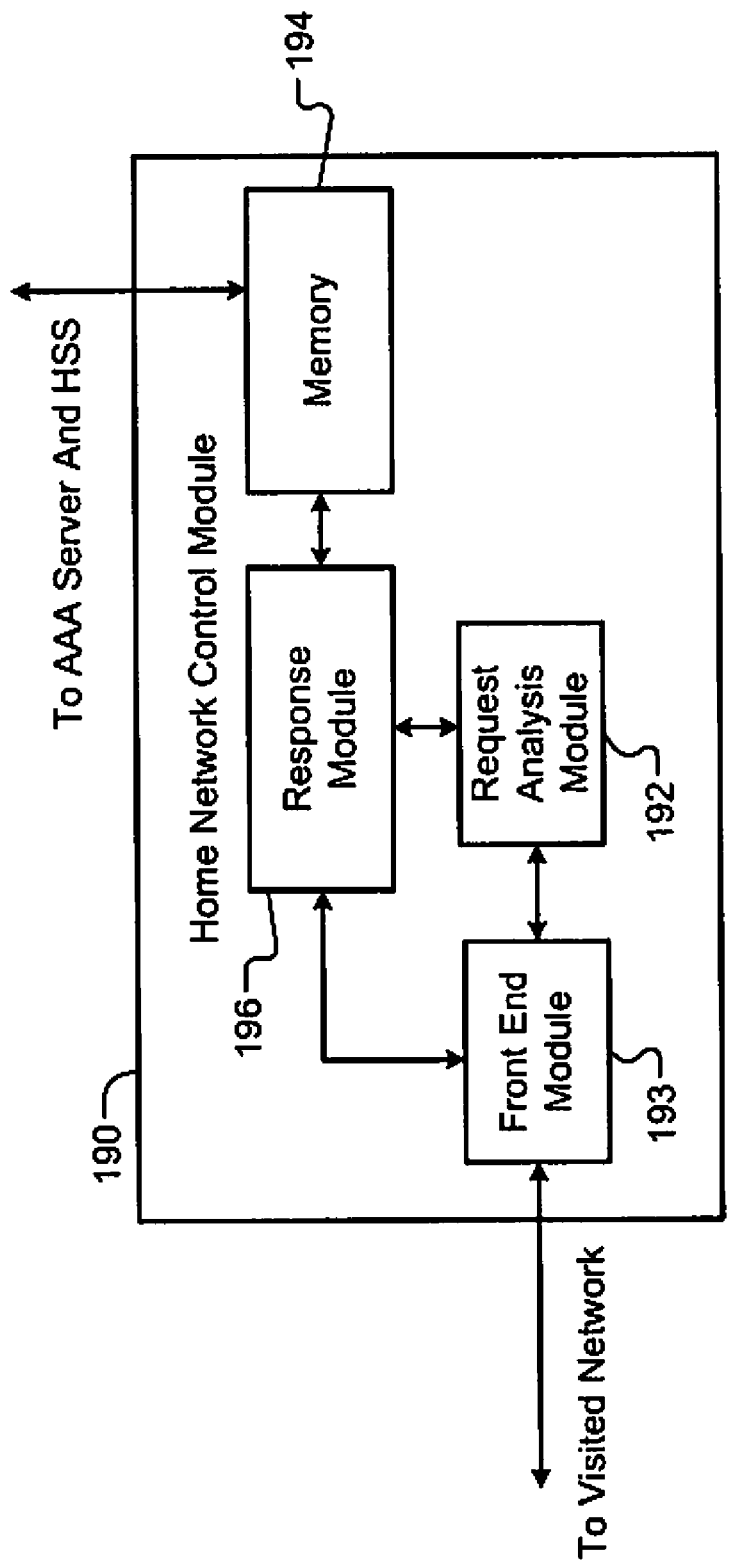
FIG. 7 is a functional block diagram of a control module for a home network according to the present disclosure.

Referring now to FIG. 7, an exemplary home network control module 190 is illustrated. The control module 190 may be included in any of the home network devices illustrated in FIG. 4, such as the IMS 55 and the PDN gateway 46, and/or may be in remote communication with any or all of the home network devices. The control module 190 may also be combined with the control module 100 of the IMS 55. The control module 190 includes a request analysis module 192 that receives and analyzes a request from the mobile terminal 30 to use resources. The request may be received and processed in a front end module 193. The requests may be received during attachment procedures.

The control module 190 may also include memory 194 that includes profiles of various terminals. The request analysis module 192 may analyze the requests based on available resources within the home network 42 and/or based on the profiles. The profiles may be based on, for example, subscription information. For example, a profile for the mobile terminal 30 may indicate that the mobile terminal 30 is authorized (i.e. has a subscription) to browse the Internet and/or authorized to communicate locally in visited networks when roaming.

A response module 196 of the control module generates responses to the requests that may include authorization for the mobile terminal 30 to connect to the first and/or second PDNs 48-1, 48-2. The serving gateway 38 may provide separate IP addresses for communications with the first and second PDNs 48-1, 48-2 based on the responses. The mobile terminal 30 may receive the IP addresses and the responses and may connect to devices locally in the second PDN 48-2 based on the responses.

Figure 8A:
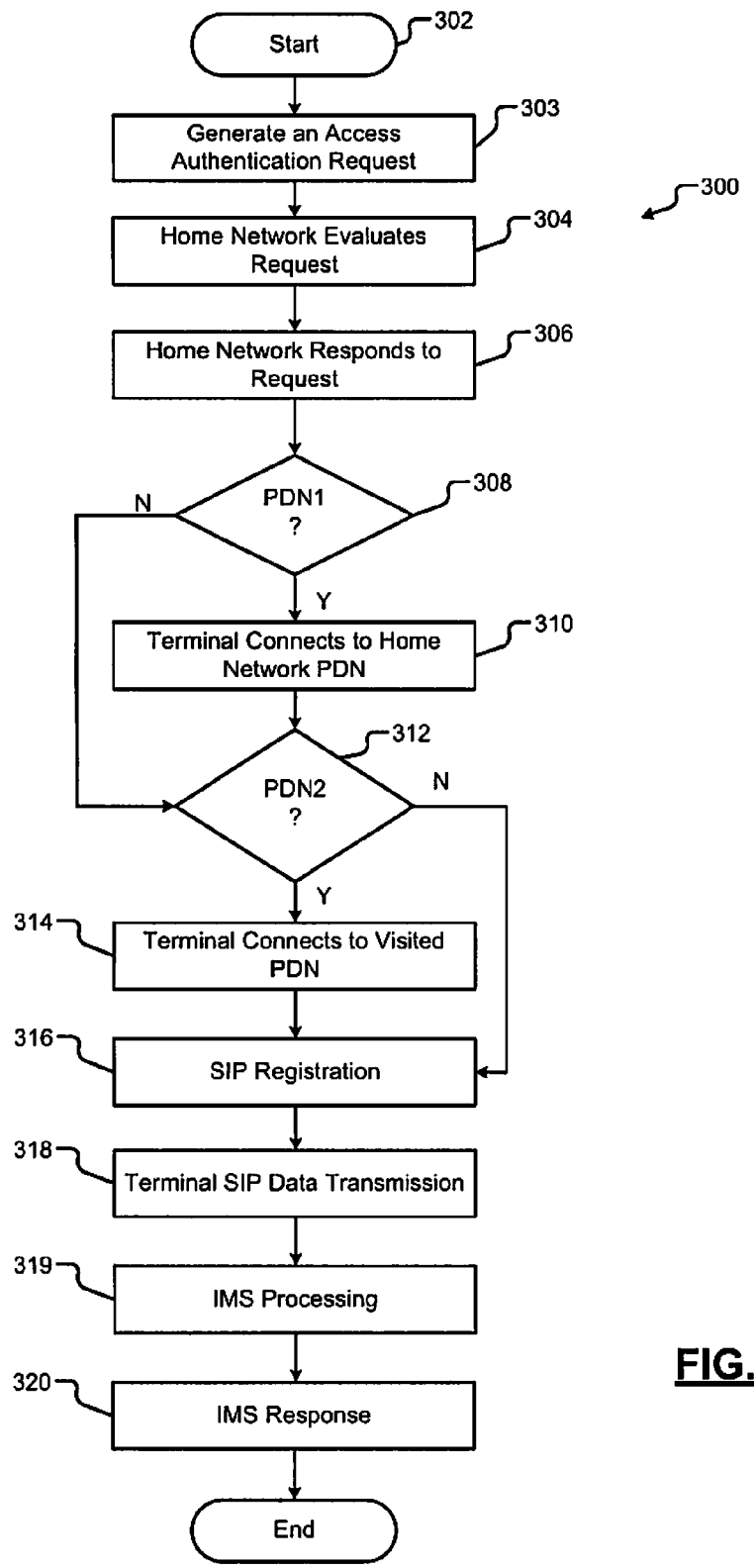
FIG. 8A illustrates a method for operating a network system according to the present disclosure.
Figure 8B:
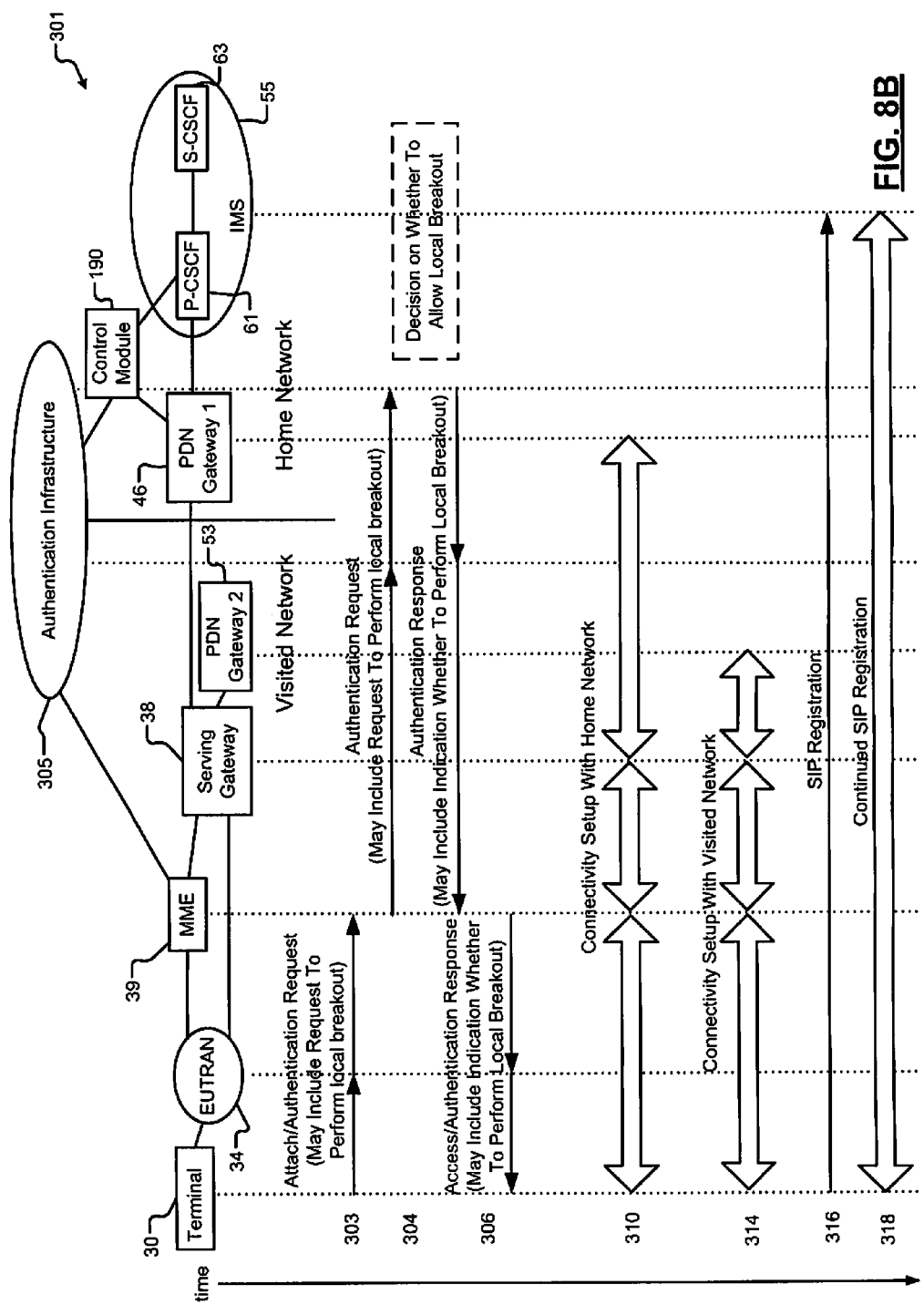
FIG. 8B is a timeline that illustrates a method for operating a network system according to the present disclosure.

Referring now to FIG. 8A, a block diagram 300 illustrates a method for operating a network system. Further, FIG. 8B illustrates a timeline 301 of steps performed based on the method for operating a network system. Control starts in step 302. In step 303, the mobile terminal 30 performs attachment and authentication with the attachment point, such as the EUTRAN 34. This may include communicating with the AAA server 68 via the MME 39. The mobile terminal 30 may also request that the home network 42 authorize connectivity. The mobile terminal 30 may request authorization of connectivity with the home network 42 and/or the visited network 32.

In step 304, the home network 42, for example, the MA server 68 of the home network 42 and/or the MME 39, may indicate that the mobile terminal 30 may set-up connectivity with the home network 42 and/or with the visited network 32. In step 306, the home network 42 may provide an indication to the mobile terminal 30 directly, in which case the mobile terminal 30 sets up connectivity to multiple PDNs. The home network 42 may also provide information on which PDNs to set-up the connectivity.

Exemplary authentication messages are described in 3GPP TS 23.401 v 0.3.0 and 3GPP TS 23.402 v0.3.0, which are incorporated herein by reference in their entirety. The authentication infrastructure 305 may implement the authentication messages and may include, for example, portions of the HSS 65, the AAA server 68 and the AAA proxy server, which may be included in the MME 39. The home network 42 may therefore provide authentication messages along with the additional information regarding terminal access to the networks 42, 32.

For the part of the authentication procedure taking place between the visited and the home networks 32, 42, additional parameters may be provided by the home network 42 to the visited network 32. The parameters may indicate the need of the mobile terminal 30 to communicate with multiple PDNs. The parameters may also indicate with which PDNs the mobile terminal 30 may communicate. During the authentication procedure, the home network 42 may inform the mobile terminal 30 that the mobile terminal 30 may obtain both an IP address in the home network 42 and an IP address in the visited network 32. The home network 42 may, for example, inform the mobile terminal 30 based on a terminal profile, the specific visited network where the user is roaming, and/or additional criteria.

Generally, the AAA server 68 and/or the MME 39 may provide connectivity permission to the mobile terminal 30 for multiple PDNs as part of the authentication procedure. Further, the AAA server 68 and/or the MME 39 may provide the permission either in response to the terminal request or based on other criteria. Other criteria may include, for example, the type of terminal making the request and/or network policies. An exemplary network policy may forbid local breakout, and therefore the AAA server 68 and/or the MME 39 may only authorize connections to PDNs of the home network 42.

Alternatively, the home network 42 may provide an indication of allowed PDNs to the visited network 32 in response to any request to use resources of the home network 42. For this example, the attachment points, such as the EUTRAN 34, set up multiple connectivities with multiple PDNs automatically and do not require permission from the home network 42.

Upon authentication, in step 308, the mobile terminal 30 determines whether it may connect with the home network 42. If permitted, in step 310, the mobile terminal 30 attempts to set up connectivity with the home network 42. In step 312, the mobile terminal 30 determines whether it may connect with the visited network 32. If permitted, in step 314, the mobile terminal 30 attempts to set up connectivity with the visited network 32.

For steps 310 and 314, respectively, the mobile terminal 30 may first request to attach to the EUTRAN 34. The MA server 68 and/or the MME 39 may use an identifier of the mobile terminal 30, such as a network address identifier, that uniquely identifies the mobile terminal 30. The attachment request requests an IP address from the EUTRAN 34. The EUTRAN 34 communicates with the serving gateway 38, and the serving gateway 38 in turn requests IP addresses, $IP_1$, $IP_2$, respectively, from the PDN gateways 46, 53. Therefore, in step 310, the mobile terminal 30 receives $IP_1$ from the first PDN gateway 46; and in step 314 the mobile terminal 30 receives $IP_2$ from the second PDN gateway 53.

$IP_1$ is used for communications with the mobile terminal 30 and the PDN gateway 46, and $IP_2$ is used for communications with the mobile terminal 30 and the PDN gateway 53. When the mobile terminal 30 sends a packet destined for the PDN 48-1, that packet may appear to originate from the PDN gateway 46 with a source address of $IP_1$. In addition, packets destined for the mobile terminal 30 are sent to the PDN gateway 53 with a destination of $IP_1$. Likewise, when the mobile terminal 30 sends a packet destined for the PDN 48-2, that packet may appear to originate from the PDN gateway 53 with a source address of $IP_2$. In addition, packets destined for the mobile terminal 30 are sent to the PDN gateway 53 with a destination of $IP_2$.

The PDN gateways 46, 53 send binding acknowledgement messages including $IP_1$ and $IP_2$ to the EUTRAN 34. A tunnel is then set up between the EUTRAN 34 and one of the PDN gateways 46, 53 for transmission of packets to and from the mobile terminal 30. The EUTRAN 34 then assigns $IP_1$ and/or $IP_2$ to mobile terminal 30.

In step 316, the mobile terminal 30 may start registration with the IMS 55 using a SIP (i.e. using SIP registration) after the mobile terminal 30 acquires connectivity with the first and second PDN gateways 46, 53. In step 318, as part of the SIP registration, the mobile terminal 30 may provide an indication to the IMS 55 that local breakout is supported. In step 318, the mobile terminal 30 may also provide the IMS 55 with the local IP address ($IP_2$) obtained from the visited network for the local breakout of the IMS media. In step 319, the IMS 55 may store the local breakout information provided in step 318 and $IP_2$.

In step 320, the IMS 55 may reply to the mobile terminal 30. The reply may include an indication as to whether it is permissible for the mobile terminal 30 to use the local IP address ($IP_2$) for local breakout in order to communicate with the second PDN 48-2. The IMS 55 may therefore check the terminal profile, the specific visited network where the terminal is roaming, and/or additional criteria.

Figure 9A:
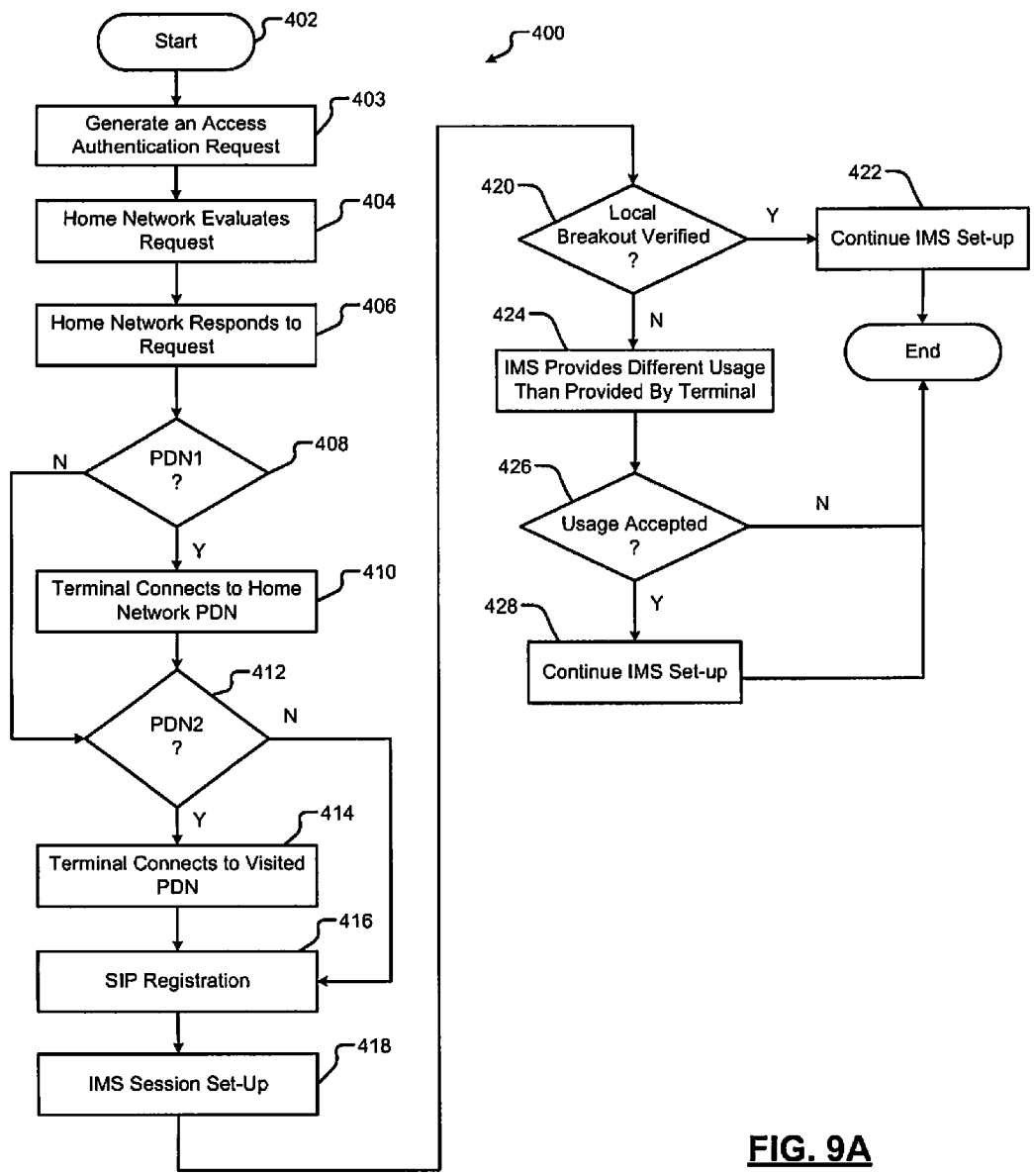
FIG. 9A illustrates a method for operating a network system according to the present disclosure.
Figure 9B:
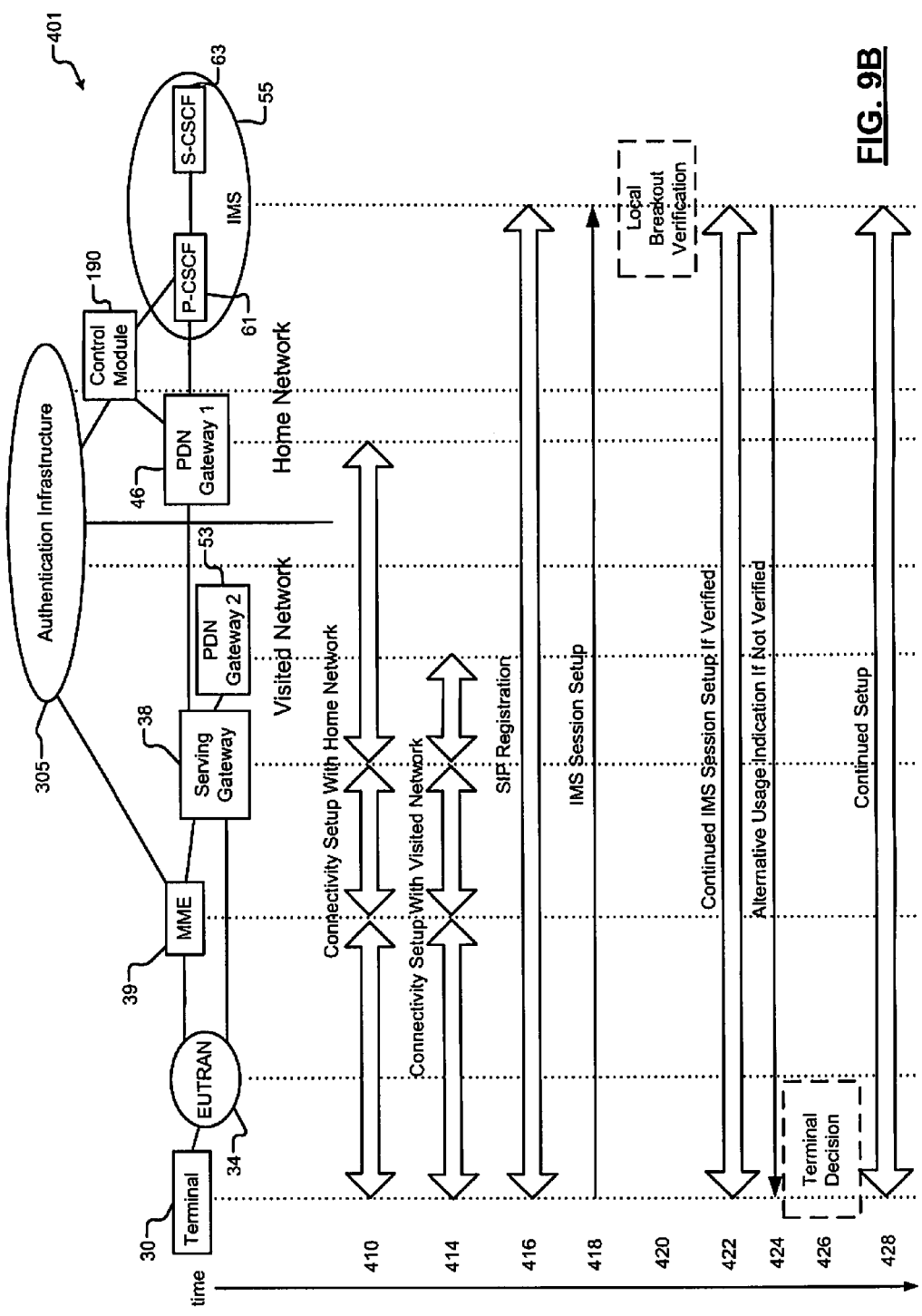
FIG. 9B is a timeline that illustrates a method for operating a network system according to the present disclosure.

Referring now to FIG. 9A, a block diagram 400 illustrates a method for operating a network system. Further, FIG. 9B illustrates a partial timeline 401 of steps performed based on the method for operating a network system. Control starts in step 402. In step 403, the mobile terminal 30 performs attachment and authentication with an attachment point. The mobile terminal 30 may also request that the home network 42 authorize connectivity. The mobile terminal 30 may request connectivity with the home network 42 and/or the visited network 32.

In step 404, the home network 42 may indicate that the mobile terminal 30 may set-up connectivity with the home network 42 and/or with the visited network 32. In step 406, the home network 42 may provide an indication to the mobile terminal 30 directly, in which case the mobile terminal 30 sets-up connectivity to multiple PDNs. The home network 42 may also provide information on which PDNs to set-up the connectivity.

Alternatively, the home network 42 may provide an indication of allowed PDNs to the visited network 32 in response to any request to use resources of the home network 42. For this example, the attachment points set-up multiple connectivities with multiple PDNs automatically and do not require permission from the home network 42.

Upon authentication, in step 408, the mobile terminal 30 determines whether it may connect with the home network 42. If permitted, in step 410, the mobile terminal 30 attempts to set up connectivity with the home network 42. In step 412, the mobile terminal 30 determines whether it may connect with the visited network 32. If permitted, in step 414, the mobile terminal 30 attempts to set up connectivity with the visited network 32.

In step 416, following connectivity set-up, the mobile terminal 30 may register with the IMS 55 using a SIP. In step 418, the mobile terminal 30 may attempt to set-up an IMS session in order to access IMS controlled services, such as voice and video communication capabilities. At this point, the mobile terminal 30 may also provide the IMS 55 with the home IP address ($IP_S$) from the first PDN gateway 46 and/or a local IP address ($IP_2$) from the second PDN gateway 53. $IP_2$ may be obtained from the visited network 32 for the local breakout of the IMS media. In step 420, the IMS 55 may verify that local breakout is allowed for the mobile terminal 30. In step 422 if local breakout is allowed, the mobile terminal 30 and IMS 55 continue the IMS session set-up.

Otherwise in step 424, the IMS 55 may inform the mobile terminal 30 that the IP address selected by the mobile terminal 30 for media connectivity (for example, $IP_2$, which is the terminal IP address for the PDN 48-2) is not acceptable. The IMS 55 may also inform the mobile terminal 30 that the call may not be established using the IP address. For example, the IMS 55 may send a signal to the mobile terminal 30 that indicates that breakout may not be allowed and that the mobile terminal 30 may instead use alternative resources. Examples of alternative resources include resources found in the first PDN 48-1 or in a visited network PDN other than the second PDN 48-2. In step 426, the mobile terminal 30 determines whether the alternative resources suggested by the IMS 55 are acceptable. In step 428, the mobile terminal 30 and IMS 55 continue IMS session set-up if the alternative resources are acceptable.

The IMS 55 may provide the aforementioned information when the mobile terminal 30 sets up an IMS session and provides either $IP_1$ or $IP_2$ to the IMS 55 for media routing. The IMS 55 may also inform the mobile terminal 30 during a session set-up when no IP addresses are provided by the mobile terminal 30. An exemplary session includes the mobile terminal 30 attempting to gain connectivity to the visited network 32 in order to obtain access to IMS controlled services.

Figure 10A:
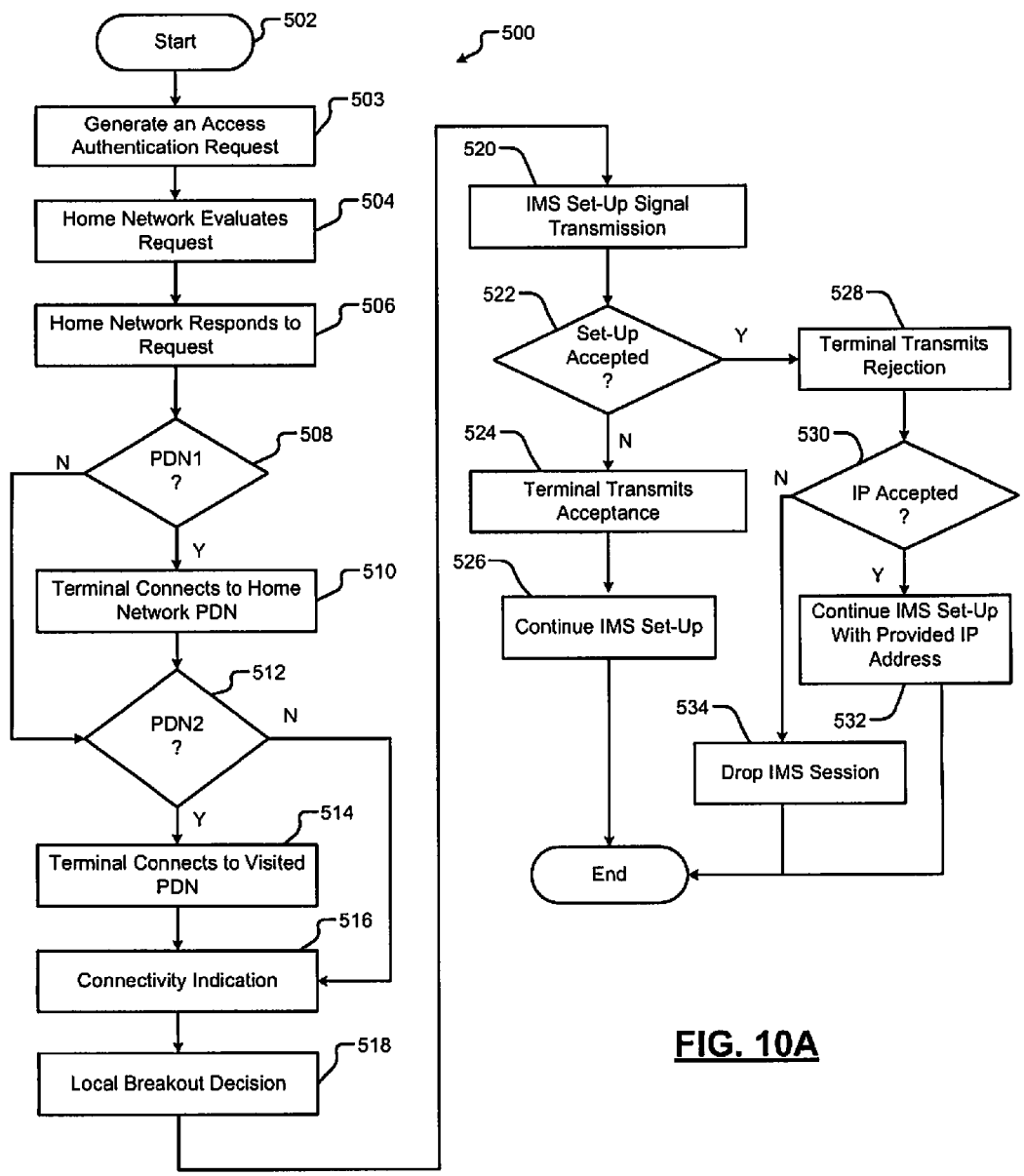
FIG. 10A illustrates a method for operating a network system according to the present disclosure.
Figure 10B:
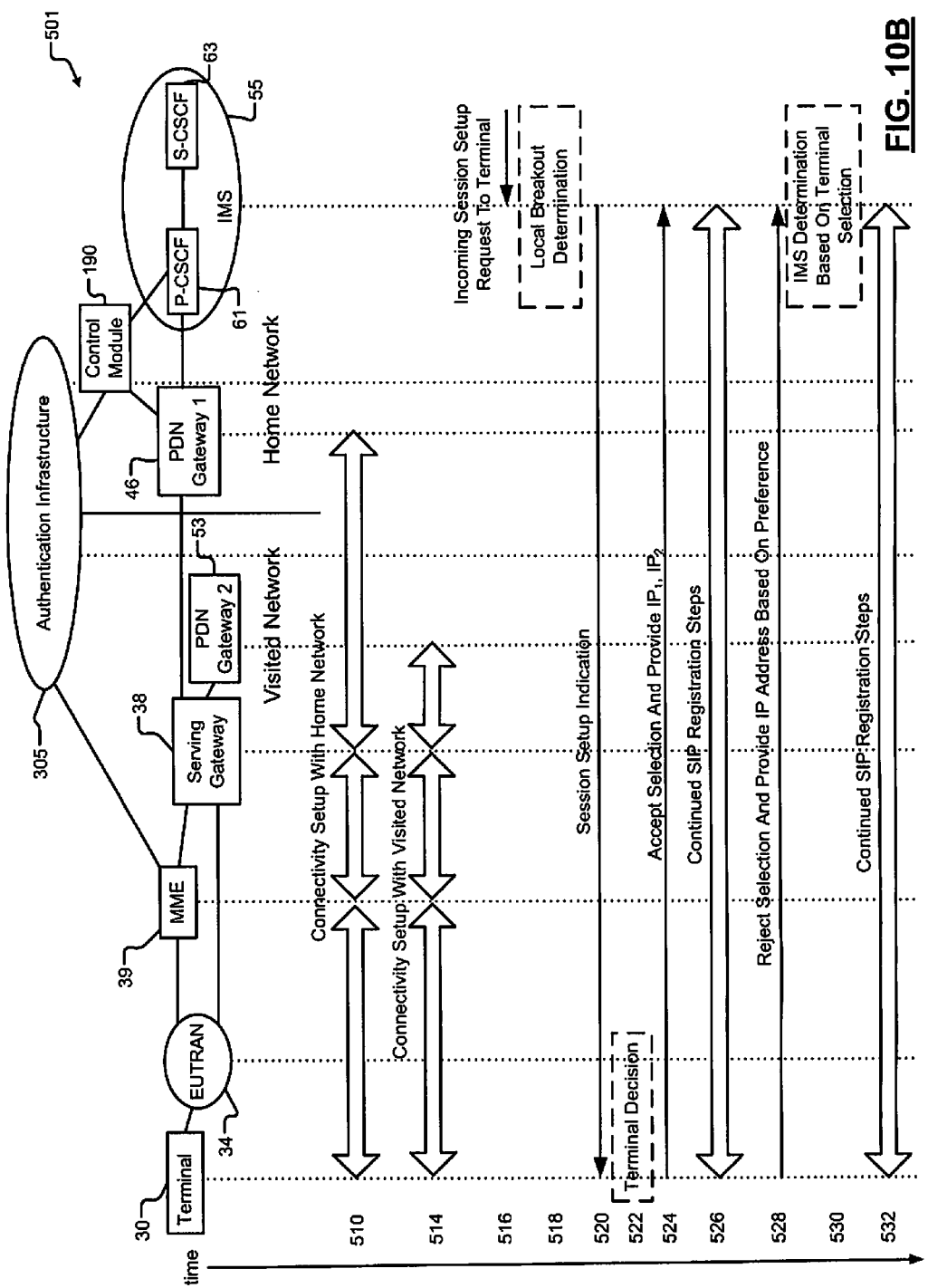
FIG. 10B is a timeline that illustrates a method for operating a network system according to the present disclosure.

Referring now to FIG. 10A, a block diagram 500 illustrates a method for operating a network system. Further, FIG. 10B illustrates a partial timeline 501 of steps performed based on the method for operating a network system. Control starts in step 502. In step 503, the mobile terminal 30 performs attachment and authentication with the attachment point. The mobile terminal 30 may also request that the home network 42 authorize connectivity. For example, the mobile terminal 30 may request connectivity with the home network 42 and/or the visited network 32.

In step 504, the home network 42 may indicate that the mobile terminal 30 may set-up connectivity with the home network 42 and/or with the visited network 32. In step 506, the home network 42 may provide an indication to the mobile terminal 30 directly, in which case the mobile terminal 30 sets-up connectivity with multiple PDNs. The home network 42 may also provide information on which PDNs to set-up the connectivity.

Upon authentication, in step 508, the mobile terminal 30 determines whether it may connect with the home network 42. If permitted, in step 510, the mobile terminal 30 attempts to set-up connectivity with the home network 42 and obtains $IP_1$. In step 512, the mobile terminal 30 determines whether it may connect with the visited network 32. If permitted, in step 514, the mobile terminal 30 attempts to set up connectivity with the visited network 32 and obtains $IP_2$.

In step 516, the mobile terminal 30 and/or another network component, such as the PDN gateway 46, may indicate to the IMS 55 that the mobile terminal 30 has set-up connectivity with at least one PDN and may request use of IMS resources. In step 518, the IMS 55 determines whether the mobile terminal 30 may be allowed to use local breakout. For example, the IMS 55 may review and analyze a terminal profile. The terminal profile may indicate that the mobile terminal 30 is allowed to use local breakout or that the terminal has restricted usages. For example, the mobile terminal 30 may only be permitted to communicate with PDNs in the home network 42.

In step 520, the IMS may transmit a session set-up signal that indicates whether or not local breakout for the mobile terminal 30 is supported by the IMS 55. In step 522, the mobile terminal 30 determines whether to accept the set-up signal that indicates the IMS choice of local breakout, which may or may not permit local breakout. In step 524, if the mobile terminal 30 accepts the set-up signal, the mobile terminal 30 transmits an acceptance signal to the IMS 55 and provides $IP_1$ and/or $IP_2$. In step 526, the mobile terminal 30 and the IMS 55 set-up IMS registration.

In step 528, if the mobile terminal 30 rejects the set-up signal, the mobile terminal 30 may transmit a signal to the IMS 55 that indicates that the mobile terminal 30 rejects the IMS choice of local breakout. The mobile terminal 30 may also provide an IP address based on a terminal preference, for example, the mobile terminal 30 may send $IP_2$ or another IP address for another acceptable PDN. In step 530, the IMS 55 receives and analyzes the terminal rejection of step 528 and the alternative IP address. In step 532, if the IMS accepts the alternative IP address, the mobile terminal 30 and the IMS continue SIP registration. Otherwise, in step 534, the IMS 55 drops the IMS session set-up.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A mobile communication terminal, comprising:
a registration module configured to initiate a registration of the mobile communication terminal with Internet protocol (IP) multimedia subsystems (IMS) within a home network when the mobile communication terminal is roaming in a visited network;
a session module configured to initiate a session set-up with the IMS to enable use of IMS resources, wherein at least one of the registration module and the session module is configured to provide a first IP address to the IMS during at least one of the registration and the session set-up, and wherein the mobile communication terminal is configured to communicate with a first packet data network (PDN) that is local to the visited network using the first IP address in order to use at least one of the IMS resources;
a connection module configured to initiate connectivity with each of the home network and the visited network prior to the registration;
a reception module configured to receive the first IP address based on the connectivity with the visited network, wherein the reception module is further configured to receive a second IP address from the IMS, wherein the second IP address differs from the first IP address, wherein the reception module is configured to receive the second IP address prior to receiving the first IP address; and
an analysis module configured to select the first IP address.

2. The mobile communication terminal of claim 1, wherein the reception module is configured to receive, based on the connectivity with the home network, a second IP address that differs from the first IP address.

3. The mobile communication terminal of claim 1, wherein the analysis module is configured to determine the first PDN is permitted to use the at least one of the IMS resources based on IMS signals.

4. A network system, comprising:
a mobile communication terminal, wherein the mobile communication terminal includes
a registration module configured to initiate a registration of the mobile communication terminal with Internet protocol (IP) multimedia subsystems (IMS) within a home network when the mobile communication terminal is roaming in a visited network; and
a session module configured to initiate a session set-up with the IMS to enable use of IMS resources, wherein at least one of the registration module and the session module is configured to provide a first IP address to the IMS during at least one of the registration and the session set-up, and wherein the mobile communication terminal is configured to communicate with a first packet data network (PDN) that is local to the visited network using the first IP address in order to use at least one of the IMS resources;
the home network, wherein the home network includes the IMS; and
the visited network,
wherein the visited network includes a first PDN gateway configured to communicate with the first PDN, and wherein the first PDN gateway is configured to provide the first IP address for communications between the mobile communication terminal and the first PDN, and
wherein the home network includes a second PDN gateway that communicates with a second PDN, and wherein the second PDN gateway is configured to provide a second IP address for communications between the mobile communication terminal and the second PDN.

5. A network system, comprising:
a mobile communication terminal, wherein the mobile communication terminal includes
a registration module configured to initiate a registration of the mobile communication terminal with Internet protocol (IP) multimedia subsystems (IMS) within a home network when the mobile communication terminal is roaming in a visited network; and
a session module configured to initiate a session set-up with the IMS to enable use of IMS resources, wherein at least one of the registration module and the session module is configured to provide a first IP address to the IMS during at least one of the registration and the session set-up, and wherein the mobile communication terminal is configured to communicate with a first packet data network (PDN) that is local to the visited network using the first IP address in order to use at least one of the IMS resources;
the visited network; and
the home network, wherein the home network includes the IMS, and wherein
the IMS includes a control module configured to select a first one of a plurality of PDNs,
the plurality of PDNs includes the first PDN and the at least one of the IMS resources,
the IMS is configured to provide the mobile communication terminal with the selection, and
the mobile communication terminal is configured to i) reject the selection and ii) provide an alternative selection to the IMS, wherein the alternative selection includes a second one of the plurality of PDNs.

6. A method for operating a mobile communication terminal, the method comprising:
- initiating a registration of the mobile communication terminal with Internet protocol (IP) multimedia subsystems (IMS) within a home network when the mobile communication terminal is roaming in a visited network;
- initiating a session set-up with the IMS to enable use of IMS resources;
- providing a first IP address to the IMS during at least one of the registration and the session set-up; and
- communicating with a first packet data network (PDN) that is local to the visited network using the first IP address in order to use at least one of the IMS resources;
- receiving, at a reception module, a second IP address from the IMS, wherein the second IP address differs from the first IP address; and
- selecting the first IP address,
- wherein the reception module receives the second IP address prior to receiving the first IP address.

7. The method of claim 6, further comprising determining that the first PDN is permitted to use the at least one of the IMS resources based on IMS signals.

8. A method for operating a mobile communication terminal, the method comprising:
- initiating a registration of the mobile communication terminal with Internet protocol (IP) multimedia subsystems (IMS) within a home network when the mobile communication terminal is roaming in a visited network;
- initiating a session set-up with the IMS to enable use of IMS resources;
- providing a first IP address to the IMS during at least one of the registration and the session set-up; and
- communicating with a first packet data network (PDN) that is local to the visited network using the first IP address in order to use at least one of the IMS resources,
- selecting a first one of a plurality of PDNs, wherein the plurality of PDNs includes the first PDN and the at least one of the IMS resources; and
- providing the mobile communication terminal with the selection, wherein the mobile communication terminal rejects the selection; and
  - provides an alternative selection to the IMS, wherein the alternative selection includes a second one of the plurality of PDNs.

* * * * *